United States Patent
Kelfkens et al.

(10) Patent No.: US 11,242,494 B2
(45) Date of Patent: Feb. 8, 2022

(54) SYSTEM AND PROCESS FOR CONTINUOUS PRODUCTION OF CONTAMINATE FREE, SIZE SPECIFIC BIOCHAR FOLLOWING GASIFICATION

(71) Applicant: Aries Gasification, LLC, Franklin, TN (US)

(72) Inventors: Renus Kelfkens, Longmont, CO (US); Matthew Newman, Spring Hill, TN (US)

(73) Assignee: ARIES CLEAN TECHNOLOGIES LLC, Franklin, TN (US)

( * ) Notice: Subject to any disclaimer, the term of this patent is extended or adjusted under 35 U.S.C. 154(b) by 103 days.

(21) Appl. No.: 16/852,237

(22) Filed: Apr. 17, 2020

(65) Prior Publication Data

US 2020/0239793 A1 Jul. 30, 2020

Related U.S. Application Data

(63) Continuation-in-part of application No. 16/705,837, filed on Dec. 6, 2019, now Pat. No. 10,662,386, (Continued)

(51) Int. Cl.
*C10J 3/42* (2006.01)
*B01J 6/00* (2006.01)
(Continued)

(52) U.S. Cl.
CPC .................. *C10J 3/42* (2013.01); *B01J 6/008* (2013.01); *C10J 3/26* (2013.01); *C10J 3/723* (2013.01);
(Continued)

(58) Field of Classification Search
CPC ............... C10J 3/26; C10J 2300/0916; C10J 2300/092; C10J 2300/0946; C10J 2200/09; C10J 3/84; C10J 2300/1628
See application file for complete search history.

(56) References Cited

U.S. PATENT DOCUMENTS 2,281,562 A   5/1942  Ditto et al.
2,516,141 A   7/1950  Newman et al.
(Continued)

FOREIGN PATENT DOCUMENTS

AU   20072479898   9/2012
CN      2677376 Y   2/2005
(Continued)

OTHER PUBLICATIONS

Biomass: ww.springvale.biz/course%20notes/week11%20Biomass%20wood%20combustion1/week11.htm.
(Continued)

*Primary Examiner* — Imran Akram
(74) *Attorney, Agent, or Firm* — Hollowell Patent Group; Kelly Hollowell

(57) ABSTRACT

A method and system for continuous production of contaminant free and size specific biochar using downdraft gasification of variable quality feedstock. The system and process of the present invention includes the transfer of biochar from a gasifier after gasification to a temperature-controlled cooling screw conveyor, into a drum magnet for ferrous metal removal into multiple diverters to separate and remove ungasified materials and non-ferrous metal contaminants, then transferred into a granulator for grinding and screening the biochar to a pre-selected size. By directly attaching a novel and continuous product treatment process to the biochar stream as it exits the gasifier, the particle size, moisture content, carbon content and yield of a contaminant free biochar product can be narrowly controlled and improved to meet strict product quality specifications required by specialty applications.

18 Claims, 16 Drawing Sheets

Related U.S. Application Data which is a continuation of application No. 16/586,181, filed on Sep. 27, 2019, now abandoned, which is a continuation-in-part of application No. 15/167,452, filed on May 27, 2016, now Pat. No. 10,465,133, which is a continuation of application No. 14/222,217, filed on Mar. 21, 2014, now Pat. No. 9,375,694, which is a continuation of application No. 13/751,983, filed on Jan. 28, 2013, now Pat. No. 8,721,748.

(51) Int. Cl.
*C10J 3/74* (2006.01)
*C10J 3/72* (2006.01)
*C10J 3/26* (2006.01)

(52) U.S. Cl.
CPC ............... *C10J 3/726* (2013.01); *C10J 3/74* (2013.01); *C10J 2200/156* (2013.01); *C10J 2300/092* (2013.01); *C10J 2300/0916* (2013.01); *C10J 2300/0956* (2013.01); *C10J 2300/0959* (2013.01); *C10J 2300/1846* (2013.01)

(56) References Cited

U.S. PATENT DOCUMENTS

| | | | |
|---|---|---|---|
| 2,936,724 A | 5/1960 | Bishop | |
| 4,004,895 A | 1/1977 | Gold | |
| 4,011,059 A | 3/1977 | Daly | |
| 4,014,664 A | 3/1977 | Kupfer | |
| 4,038,152 A * | 7/1977 | Atkins | C10B 7/06 201/2.5 |
| 4,137,051 A | 1/1979 | Godwin | |
| 4,146,369 A | 3/1979 | Flesch | |
| 4,225,392 A | 9/1980 | Taylor | |
| 4,334,484 A | 6/1982 | Payne | |
| 4,531,462 A | 7/1985 | Payne | |
| 4,583,992 A | 4/1986 | Rogers | |
| 4,659,340 A | 4/1987 | Weaver | |
| 4,672,899 A | 6/1987 | Kainer | |
| 4,764,185 A | 8/1988 | Mayer | |
| 4,919,686 A * | 4/1990 | Edwards | C10B 47/18 201/25 |
| 5,226,927 A | 7/1993 | Rundstrom | |
| 5,230,716 A | 7/1993 | Notestein | |
| 5,425,791 A | 6/1995 | Tanca | |
| 6,112,677 A | 9/2000 | Kuntschar et al. | |
| 6,474,985 B1 | 11/2002 | Miller | |
| 9,951,279 B2 | 4/2018 | Mason | |
| 10,072,223 B2 | 9/2018 | Koenig et al. | |
| 2005/0155288 A1 | 7/2005 | Rogers | |
| 2006/0133973 A1 | 6/2006 | Saares | |
| 2006/0265954 A1 | 11/2006 | Dogru et al. | |
| 2009/0119993 A1 * | 5/2009 | Neves | C10J 3/74 48/197 R |
| 2010/0050515 A1 | 3/2010 | Wakefield | |
| 2010/0132596 A1 | 6/2010 | Longatte | |
| 2011/0078951 A1 | 4/2011 | Blasiak et al. | |
| 2012/0017510 A1 | 1/2012 | Leveson | |
| 2012/0036777 A1 | 2/2012 | Patel | |
| 2012/0171084 A1 | 7/2012 | Kuske | |
| 2012/0210645 A1 | 8/2012 | Rutberg | |
| 2012/0304535 A1 * | 12/2012 | Bai | C10L 5/46 44/589 |
| 2014/0151603 A1 | 6/2014 | Anderson | |
| 2014/0332724 A1 * | 11/2014 | Tsangaris | C10J 3/726 252/373 |
| 2014/0339346 A1 * | 11/2014 | Koenig | B65G 37/00 241/101.5 |
| 2015/0218457 A1 * | 8/2015 | Jacobsen | F23G 5/50 201/20 |
| 2016/0045841 A1 * | 2/2016 | Kaplan | B01D 53/48 429/49 |
| 2017/0247618 A1 * | 8/2017 | Ishii | C08J 11/16 |

FOREIGN PATENT DOCUMENTS

| | | | |
|---|---|---|---|
| CN | 101214463 A * | 7/2008 | |
| CN | 102492475 | 6/2012 | |
| DE | 3346105 | 7/1985 | |
| RU | 2472068 | 1/2013 | |
| WO | WO-2003040267 | 5/2003 | |
| WO | WO-2008068596 | 6/2008 | |
| WO | WO-2009009693 | 1/2009 | |
| WO | WO-2009100487 | 8/2009 | |
| WO | WO-2010064222 | 4/2010 | |
| WO | WO-2011115770 | 9/2011 | |

OTHER PUBLICATIONS

Ganesh, Biomass Energy for Rural Electrification: An Analysis of Small Scale Implementation, Department of Electrical and Computer Engineering, Calgary, Sep. 2006.

Gaseous Fuel Production: www.emispec.ca/en/gaseous-fuel-production.php.

Gasification: www.thompsonspaven.com/acatalog/gasification.html.

Hybrid VAM and Coal Waste Fired Power Generation: www.metts.com.au/hybrid-vam-and-coal-waste-fired-power-generation.html.

Kumar, et al., Modeling and Simulation of Down Draft Gasifier, Journal of Applied Sciences, 8:271-279,2008.

My Home-Made Biomass Gasifier: www.mdpub.com/gasifier/index.htmlV.

Waste Gasification: www.wastesyn.com/tech_wg.html.

What is Gasification: http://ankurscientific.com/whatisgasification.htm.

* cited by examiner

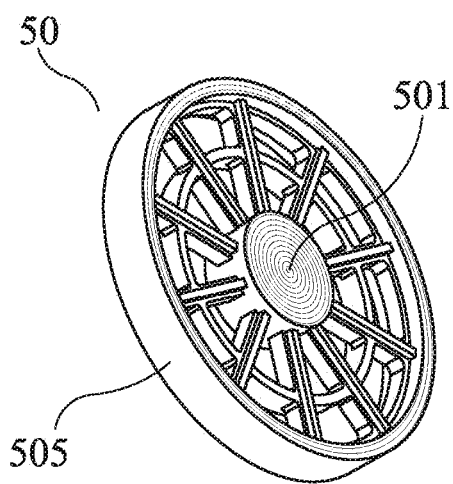
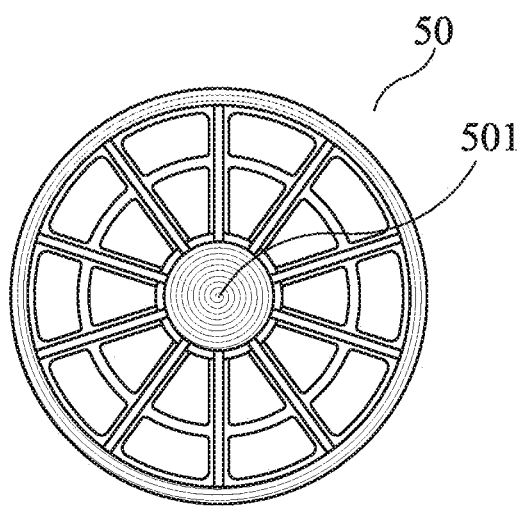
FIG. 11                FIG. 12
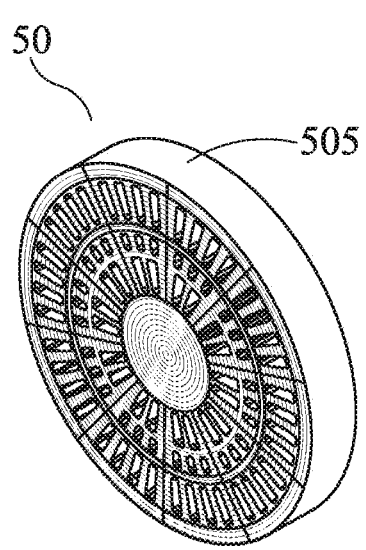
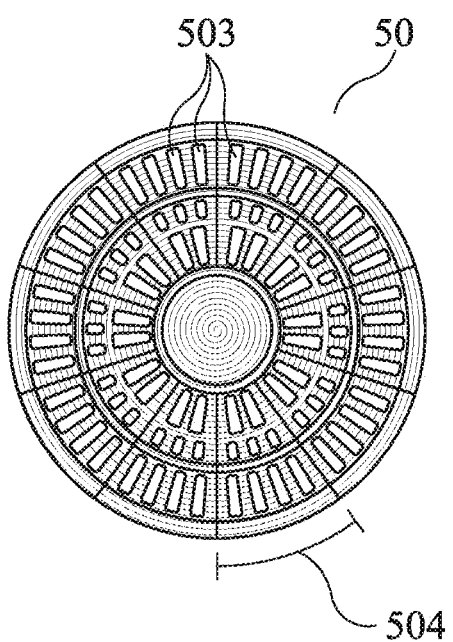
FIG. 13                FIG. 14
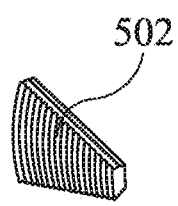
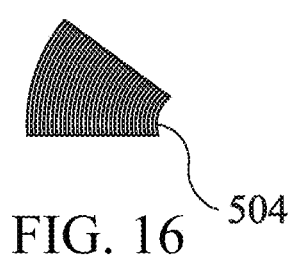
FIG. 15                FIG. 16

SYSTEM AND PROCESS FOR CONTINUOUS PRODUCTION OF CONTAMINATE FREE, SIZE SPECIFIC BIOCHAR FOLLOWING GASIFICATION

RELATED APPLICATIONS

The present application is a Continuation-in-part of U.S. application Ser. No. 16/705,837 filed on Dec. 6, 2019, which is a Continuation of U.S. application Ser. No. 16/586,181, filed Sep. 27, 2019, which is a Continuation-in-part ("CIP") of U.S. application Ser. No. 15/167,452, now U.S. Pat. No. 10,465,133 filed May 27, 2016, entitled Device with Dilated Oxidation Zone for Gasifying Feedstock; which is a Continuation of U.S. application Ser. No. 14/222,217, now U.S. Pat. No. 9,375,694 filed Mar. 21, 2014, now U.S. Pat. No. 9,375,694, entitled Device with Dilated Oxidation Zone for Gasifying Feedstock; which is a Continuation of issued U.S. application Ser. No. 13/751,983, now U.S. Pat. No. 8,721,748 filed Jan. 28, 2013, entitled Device with Dilated Oxidation Zone for Gasifying Feedstock, all of which are herein incorporated by reference in their entireties.

FIELD

The invention relates to thermochemical technology and equipment, in particular, to processes and apparatuses for gasifying solid biomass, household and industrial waste as well as other carbon-containing renewable feedstock coupled with a method for continuous and high yield production of contaminant free biochar following downdraft gasification of feedstock.

BACKGROUND

Gasification is a continuous thermal decomposition process in which solid organic or carbonaceous materials (feedstock) break down into a combustible gas mixture. So long as feedstock is provided the process remains continuous. When biomass is used as the feedstock, gasification and combustion of Producer Gas is considered to be a source of renewable energy. In addition, lower cost Biochar from biomass waste products (agricultural and forestry or other suitable biowaste materials) is growing in importance and application across a variety of industries.

In addition, specialized applications for biochar derived from biomass waste products are rising in competition with granular activated carbon in new and existing renewable green carbon markets. These specialized applications often require a specific particle size and moisture content for the biochar product.

Traditionally, biochar is recognized as a by-product of feedstock gasification. The quality of biochar produced by downdraft gasification is determined, in part, by the quality of the biomass waste feedstock fed to the gasifier. Another factor is the level of contaminants such as materials not susceptible to gasification such as lignin, residual ferrous and non-ferrous impurities (hereafter "contaminants") found in the variable quality feedstock fed into the gasifier or materials simply not converted to producer gas due to insufficient temperatures within the reactor such as upon start up (hereafter "ungasified materials" or "unburned materials"). "Contaminant free" biochar means biochar in which ungasified material, ferrous metal, non-ferrous metal and biochar larger than the pre-selected size have been removed.

Existing systems typically involve processing of high quality, clean carbon rich feedstocks in advance of gasification. To remove contaminants and provide a more consistent feedstock the biomass can be pretreated prior to gasification; but because low-level contaminants are not detrimental to gasification most biochar production processes do not include contaminant removal steps. Most biochar production processes use batch processing i.e., performing an industrial process on material in batches of a limited quantity or number. Most biochar production processes also use independent processing systems that receive charcoal or carbon products in a bin.

Prior applications herein referenced have provided a downdraft gasifier design that allows the flow rate of feedstock to be controlled as it passes through the Oxidation Zone with minimal restriction in order to improve the overall volume and flow of feedstock passing through the gasifier including a method for continuous production of biochar using the down draft gasification device.

What is needed is an integrated down draft gasification and biochar processing system for continuous production of contaminant free, pre-size selected ("size specific") biochar. The present method is an integrated down draft gasification and biochar processing system for continuous production of contaminant free biochar from variable waste product feedstocks without increased feedstock preparation. The present method uses a high yield biochar downdraft gasification system for continuous biochar production providing an adjustable yield between 10% and 25% of total feedstock input with an input capacity ranging from a minimum of 700 kg/hr. and exceeding 2,400 kg/hr.; depending on operating conditions. The present method is adjustable to variable biochar specifications including yield, particle size and moisture content.

SUMMARY

A downdraft gasifier, described in previous applications, was previously repurposed to produce a continuous and high yield of biochar as a primary product on a continuous basis and at a larger scale than typical pyrolysis units designed specifically for biochar production. What is now described is a method and system for production of contaminant free and size specific biochar. By combining the presently described system and method for production of contaminant free and size specific biochar with the high yield and continuous production of biochar previously described using the downdraft gasifier, the present invention provides a system and method for continuous production of contaminant free and size specific biochar.

The system and process of the present invention includes the transfer of biochar from a gasifier after gasification to a temperature-controlled cooling screw conveyor and into a drum magnet for ferrous metal removal. From the drum magnet the biochar enters a first diverter that separates and removes ungasified materials. From the first diverter, the biochar is transferred to a second enclosed belt conveyor with an integrated metal detector that triggers a second diverter to separate and remove non-ferrous metal contaminants. The contaminant free biochar is then transferred into a granulator for grinding and screening the biochar to a pre-selected size. By directly attaching a novel and continuous product treatment process to the biochar stream as it exits the gasifier, the particle size, moisture content, carbon content and yield of a contaminant free biochar product can be narrowly controlled and improved to meet strict product quality specifications required by specialty applications.

BRIEF DESCRIPTION OF THE DRAWINGS

FIG. 11 shows a perspective view of a grate frame.

FIG. 12 shows a top view of a grate frame.

FIG. 13 shows a perspective view of an assembled grate having a spiral groove.

FIG. 14 shows a front view of an assembled grate having holes cut in the grate.

FIG. 15 shows a perspective view of removable segment of a grate.

FIG. 16 shows a top view of a removable segment of a grate.

DETAILED DESCRIPTION

The definitions provided in previously related applications herein apply. Other defined terms are capitalized in other sections of this document where they are used. Capitalized terms shall include all variants, singular and/or plural versions of the terms used herein.

Overview of the Gasifier Zones

The present invention relates to a method and apparatus for gasifying carbon-containing biomass feedstock. The gasifier comprises a plurality of conjoined and vertically positioned tubes. The tubes have an interior wall and exterior wall and a proximal and distal end wherein the proximal end provides an inlet and the distal end provides an outlet. The gasifier has three separate sequential reaction zones: (1) a Pyrolysis Zone; (2) an Oxidation Zone beneath the Pyrolysis Zone; and (3) a Reduction Zone beneath the Oxidation Zone. A rotating and vertically adjustable grate is located below, but not attached to, the Reduction Zone. Unlike other gasifiers, this is a partially open core gasifier; there is no airtight bottom wall sealing the Reduction Zone or the bottom of the gasifier itself.

Figure 1:
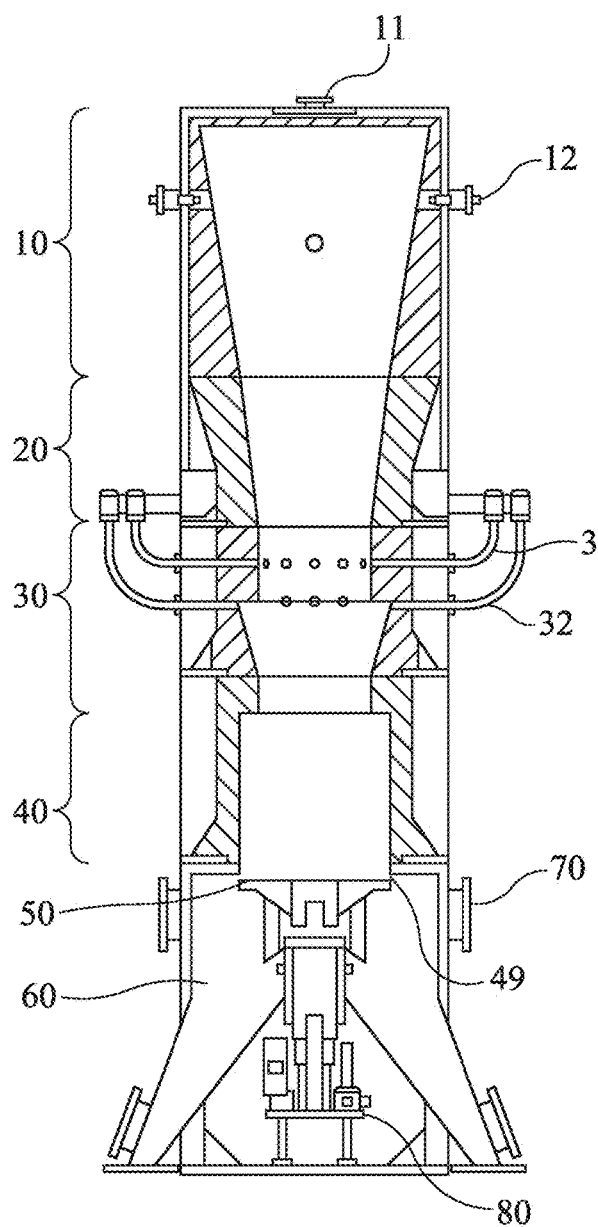
FIG. 1 shows a cutaway front view of a gasifier.
Figure 2:
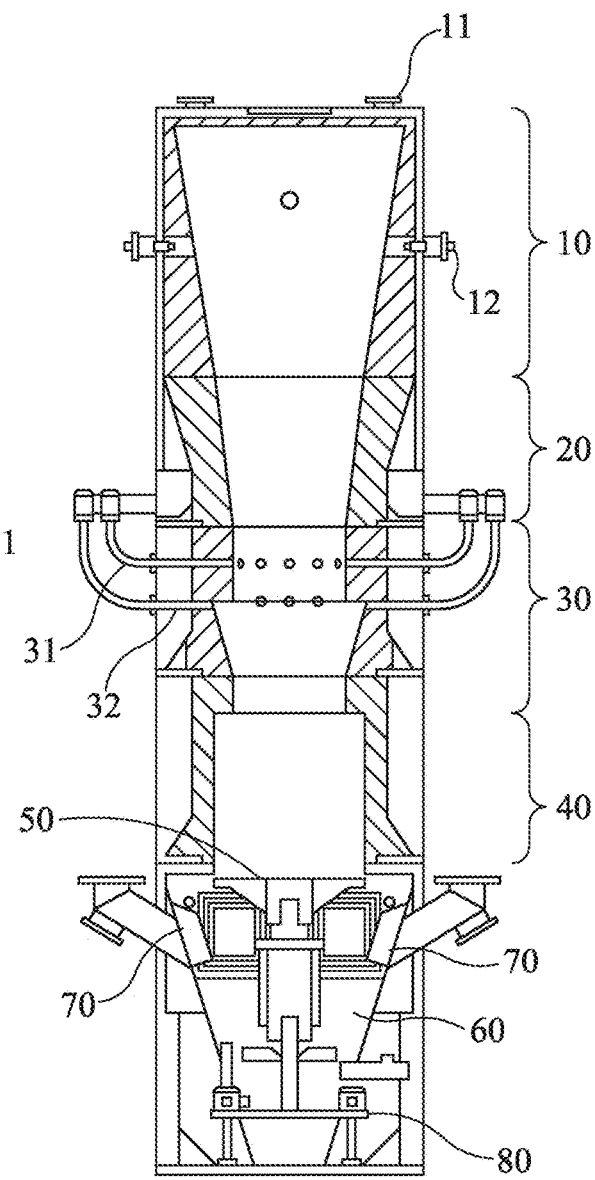
FIG. 2 shows a cutaway side view of a gasifier.

FIGS. 1 and 2 show a cutaway front view of a gasifier. This downdraft gasifier is a sequential, co-current flow, gravity-assisted, thermo-chemical phase change gasifier having at least three zones: a Pyrolysis Zone 20, an Oxidation Zone 30 and a Reduction Zone 40. The gasifier partially oxidizes a portion of the feedstock, which releases enough heat activation energy to start a thermo-chemical solid-to-gas phase change reaction of the remaining feedstock into Producer Gas. The process of gasification is a sequence of reactions including water evaporation, lignin decomposition, cellulosic deflagration and carbon reduction and is controlled by injecting Oxidant Streams into the partially pyrolysed feedstock. Although the present invention will be described in the context of a method and apparatus for processing biomass, the principles described may be applied to many other types of feedstock and various embodiments will be readily apparent to those skilled in the art.

The interior of the entire gasifier is lined with silica carbide, silica oxide, aluminum oxide, refractory alloys, other ceramics or another material having similar properties that is stable at high temperatures. Non-volatile and ungasified also referred to as unburned materials are separated from the Producer Gas by gravity as these materials fall to the bottom of the gasifier. This high efficiency gasifier converts the chemical potential energy of feedstock into Producer Gas, with the average amount of Biochar generated being about 1%-10% by weight of the original feedstock.

Figures 3, 4:
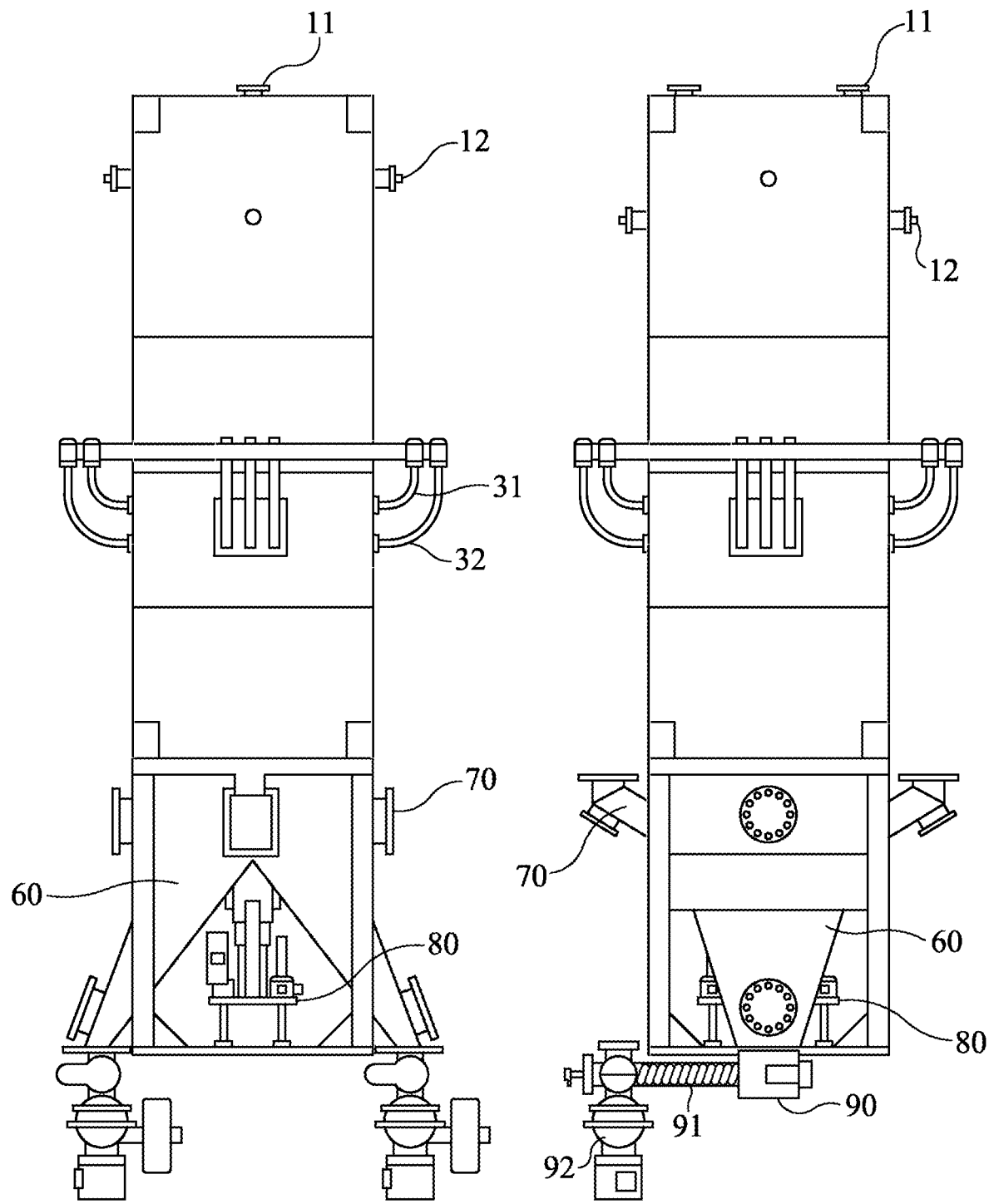
FIG. 3 shows the exterior front view of a gasifier.
FIG. 4 shows the exterior side view of a gasifier.

FIGS. 3 and 4 show the exterior front and side views of a gasifier. Feedstock moves downward in the gasifier as gasification takes place. As the gasifier reaches a steady operating state (i.e., the state wherein each zone of the gasifier has reached a steady and sustained temperature), a vertical temperature gradient forms inside the gasifier and the feedstock stratifies into a sequence of layers or zones roughly corresponding to the Pyrolysis Zone 20, the Oxidation Zone 30 and the Reduction Zone 40 based on the steps in the gasification process. There are no fixed boundaries between these zones, but instead the boundaries are contiguous. Therefore, there are transitional gradients having mixed properties of each of the adjacent zones (i.e., feedstock pyrolysis may begin in the Drying Zone 10 and oxidation may begin in the Pyrolysis Zone 20). Feedstock is maintained at a level above the Pyrolysis Zone 20 and pulled down through the Pyrolysis Zone 20 by gravity so that descending feedstock replaces feedstock that has been gasified. Gases and feedstock flow in a downward direction inside the gasifier. Solid materials flow through the gasifier by gravity. Gases move downward through the gasifier by pressure differential.

Solids (e.g., feedstock and Biochar) are held inside the gasifier by a vertically adjustable, rotating grate 50 located just below the Reduction Zone 40 of the gasifier, as shown in FIGS. 1, 2, 3 and 4. The residence time of solids within the gasifier is controlled by the rotational speed of the grate 50, the vertical position of the grate 50, and the rate of gasification (i.e., phase change) within the gasifier. The Biochar accumulates on top of the grate 50 and acts as a pseudo-seal for the bottom of the gasifier, which then allows the gasifier to pressurize, and maintain pressurization even as Biochar continuously leaves the gasifier. Biochar falls from the bottom of the gasifier through the rotating grate 50 or out the Bypass 49. Once the Biochar falls from the grate 50 or the Bypass 49, it falls into one or more collection chutes 60 below the grate 50 and then into a residue box 90, where it is removed from the gasifier by an auger 91.

In one embodiment, the zones of the gasifier include: the Drying Zone 10, the Pyrolysis Zone 20, the Oxidation Zone 30, the Reduction Zone 40 with a grate 50 located underneath the gasifier. Below the gasifier are gas collection vents 70, Biochar collection chutes 60 and a Biochar residue box 90.

Figure 5:
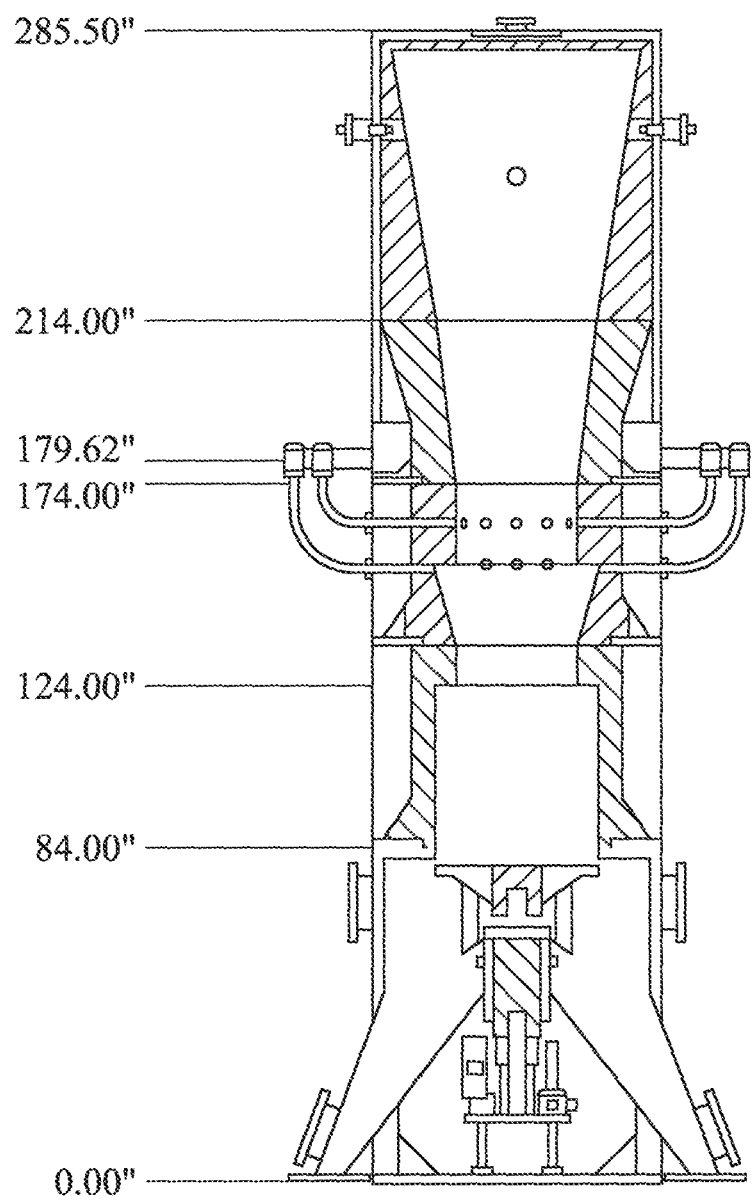
FIG. 5 shows a cutaway front view of a gasifier with dimensions shown in inches.
Figure 6:
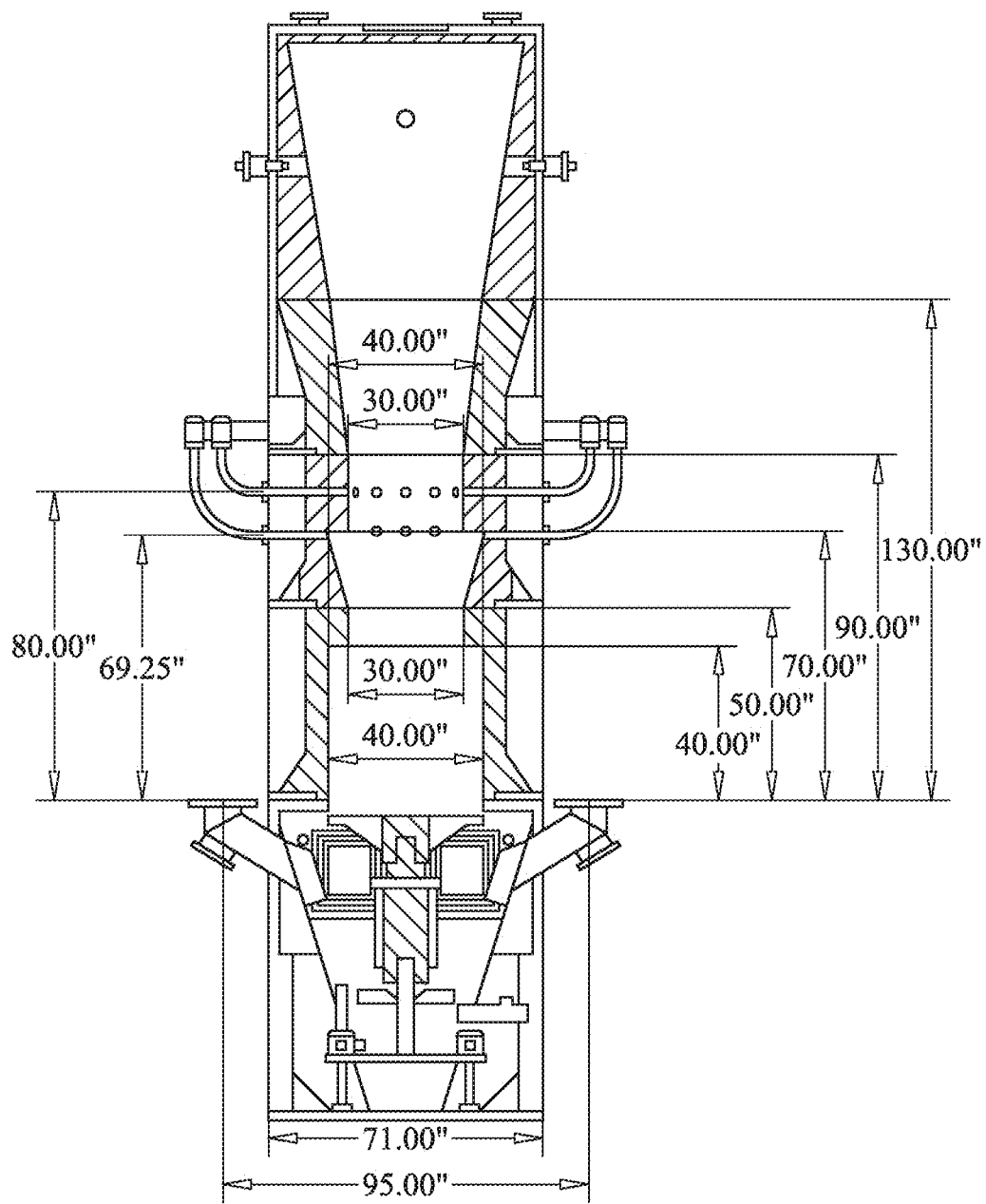
FIG. 6 shows a cutaway side view of a gasifier with dimensions shown in inches.

FIGS. 5 and 6 show a cutaway front and side view of a gasifier with dimensions.

The Drying Zone: Overall Description, Size and Functioning

In the Drying Zone 10, moisture within the feedstock is evaporated as it is exposed to radiant heat emitting from the Oxidation Zone 30. The water vapor flows downward through the Pyrolysis Zone 20 toward the Oxidation Zone 30 along with the Bed Oxidant Stream and the Purge Oxidant Stream being fed into the gasifier. Temperatures in the Drying Zone 10 can vary extensively depending on how the gasifier is operated. By way of example, for woodchips with 25% moisture content, the normal range of temperature in the Drying Zone 10 is about 100 to 300° F. The depth of the Drying Zone 10 in one embodiment may be between zero and six feet tall. This depth may increase with the moisture content of the feedstock, the size of the gasifier and the embodiment of the gasifier used. Radiant heat from the Oxidation Zone 30 drives the evaporative processes. However, preheating the Bed Oxidant Stream and the Purge Oxidant Stream can accelerate the drying process.

Drying the feedstock inside the gasifier is an endothermic process, and so energy (i.e., heat) is required to dry and release water from the feedstock as steam, which steam assists the reactions occurring below. The wetter the feedstock, the more energy the Drying Zone 10 requires.

The primary physical change in the Drying Zone 10 is:

$$H_2O_{(l)} + Heat\ H_2O_{(g)}$$

Wherein "H" is Hydrogen, "0" is oxygen, "1" is liquid, and "g" is gas.

Description of the Feeding Mechanism and Fill Level Indicators

Because the gasifier becomes pressurized during operation, a Pressure Lock may be used to bring feedstock into the gasifier while maintaining the gasifier's pressure. A top valve of the Pressure Lock opens to admit feedstock into the Pressure Lock and then closes. The interior of the Pressure Lock pressurizes to match the air pressure of the Pyrolysis Zone 20 (or optional Drying Zone 10), which may be controlled by a user through the Control Systems, before a bottom valve opens allowing the feedstock to leave the Pressure Lock and enter the gasifier at the adjusted air pressure.

The Pressure Lock may be fabricated from materials such as Schedule 40 seamless carbon steel pipe, 150-pound class steel flanges and standard 150-pound class slide gate valves, such as knife-gate valves. This Pressure Lock assembly may be integrated into the equipment design and use a pair of standard industrial knife-gate valves with a pipe between them. The pipe in one embodiment may be 18" schedule 40 pipe orientated vertically. The length of the pipe may be adjusted depending on the feedstock delivery method and desired volume. An example of a Pressure Lock is 72" in length, which will provide 100-120 pounds of feedstock per feedstock dump into the Drying Zone 10 (where applicable) or the Pyrolysis Zone 20. In one embodiment, attached to the pipe are threaded couplings for receiving (1) a level switch, such as a rotary level switch, limit switch, photon switch, or a laser switch, and (2) a pressure transmitter, and (3) a pressurized air supply line.

The end user may automate the gasifier feedstock filling process with a timer or by using a microwave sensor or another suitable fill level indicator, to detect the presence of feedstock at the fill level in the gasifier and also in the Pressure Lock ("Fill Level Indicators"). The Drying Zone 10 of the gasifier may have one or more Fill Level Indicators 12 capable of functioning in high temperature environments. Once the Fill Level Indicator 12 detects that the feedstock level is low, the automatic feed mechanism begins. One gasifier design with multiple Fill Level Indicators 12 allows more options in choosing the height of the feedstock bed when using an automatic filling system.

In one embodiment, the top valve of the Pressure Lock opens and a bucket loading mechanism dumps feedstock into the Pressure Lock until a Fill Level Indicator in the Pressure Lock detects that it is full. The top valve of the Pressure Lock closes, and the Pressure Lock pressurizes to match the pressure of the Drying Zone 10 (if applicable) or the Pyrolysis Zone 20. Then, the bottom valve of the Pressure Lock opens and deposits the feedstock onto a pressurized auger that is connected to the Drying Zone 10 (where applicable) or the Pyrolysis Zone 20. The auger then deposits the feedstock into the top of the gasifier. The gasifier's control systems determine when to initiate each feedstock fill cycle based on the signals, such as temperature or pressure changes, received from various sensors and indicators on the gasifier.

The Pyrolysis Zone: Overall Description, Size and Functioning

The Pyrolysis Zone 20 is directly below the Drying Zone 10 (where a Drying Zone 10 is included) within the gasifier. The Pyrolysis Zone 20 may be increased or decreased in height based on the properties of the predominant type of anticipated feedstock. A taller Pyrolysis Zone 20 will accommodate wetter and/or more complex materials that require more drying and longer pyrolysis times.

In the Pyrolysis Zone 20, vapors, oils, and constituent gases are distilled and moved downward by the effects of gravity, pressure differences and steam created in the Drying Zone 10 and the Pyrolysis Zone 20. The Pyrolysis Zone 20 is endothermic at the top and relies on heat released from below. Toward the bottom of the Pyrolysis Zone 20, where the temperature increases, the feedstock begins to spontaneously break down as it becomes chemically unstable at the elevated temperatures. Therefore, the decomposition of feedstock occurring in the lower section of the Pyrolysis Zone 20 is exothermic and releases heat. In one embodiment, the Pyrolysis Zone 20 is four to six feet deep.

Pyrolysis chemistry is highly complex. The principal chemical and physical changes occurring in this zone can be simplified and represented by the following:

$$C_xH_yO_z\ (s) + Heat\ Organic\ Vapors\ (formaldehyde, alcohols, tars, etc.)$$

$$C_xH_yO_z(s) CH_4 + H2 + C(s) + Organic\ Vapors\ (tars) + Heat$$

Because some Oxygen is present in the Pyrolysis Zone 20 from the Oxidant Streams being fed into the gasifier, oxidation may occur as feedstock approaches the bottom of the Pyrolysis Zone 20.

The Oxidation Zone: Overall Description, Size and Functioning

The Oxidation Zone 30 is the zone in the gasifier leading up to and away from the Oxidation Band 350 or the general step of the method including formation of the Oxidation Band 350. The Oxidation Zone 30 is where the Oxidation Band 350 forms and represents the hottest step in the gasification process and is where the cellulosic fraction of the feedstock converts from a solid to a gas.

The First Gradient (the Induced Feedstock Gradient)

Figure 7:
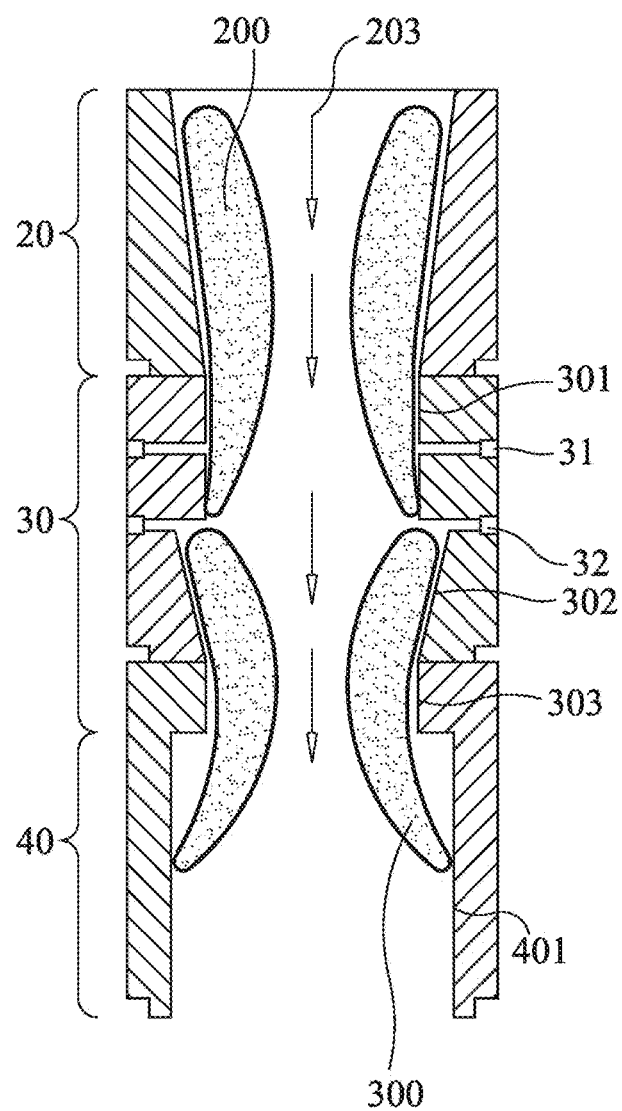
FIG. 7 shows a cutaway side view of a gasifier illustrating the densest portion of an induced and an entrained gradient.
Figure 8:
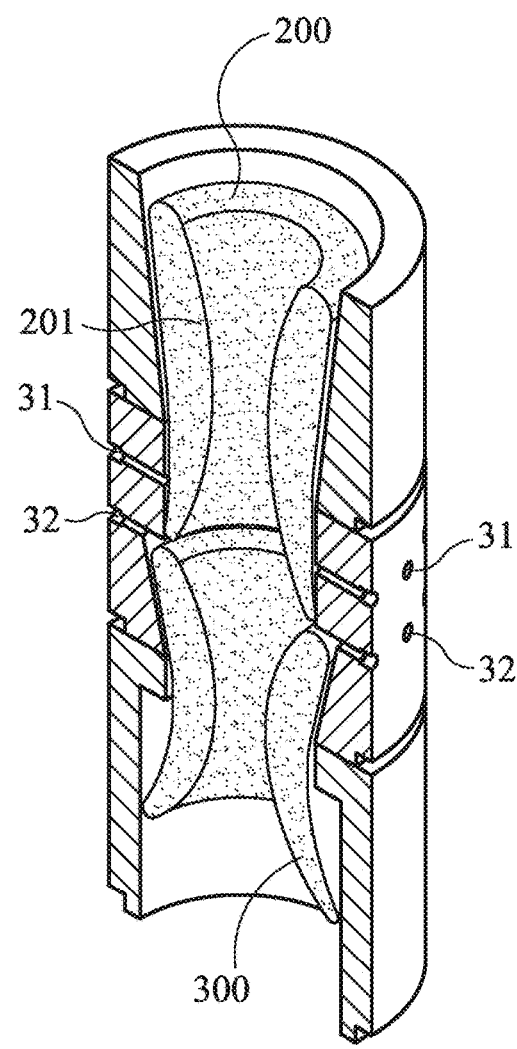
FIG. 8 shows a cutaway perspective view of a gasifier illustrating the densest portion of an induced and an entrained gradient.

Shown in FIGS. 7 and 8, during operation, the flow of an Oxidant Stream through Pyrolysis Zone 20 induces a feedstock gradient to form (1) vertically, beginning toward the top of the outside wall of the Pyrolysis Zone 20 and ending down at a lower ring of Plano Air Inlets 32 in the Oxidation Zone 30 and (2) horizontally, beginning in the center of the gasifier and ending at the wall of the gasifier (the "Induced Feedstock Gradient").

As shown in FIGS. 7, 8, 9, and 10, this Induced Feedstock Gradient is an increasing and differential density of feedstock becoming denser toward the perimeter of the gasifier wall and above the Oxidation Band 350 (the "Densest Portion") formed by at least four factors acting in concert: (1) the Pressure Wave from the Oxidation Band 350 pressing feedstock against the interior wall of the gasifier; (2) the geometry of the Pyrolysis Zone 20 and the Oxidation Zone 30 (i.e., angles of the walls); (3) the total volume of the Oxidant Stream flowing into the Pyrolysis Zone 20 and the Oxidation Zone 30; and (4) the relative volume of the Oxidant Stream flowing into each of the Pyrolysis Zone 20 and the Oxidation Zone 30. The Densest Portion of the Induced Feedstock Gradient is illustrated at 200.

The Oxidation Band

Figure 9:
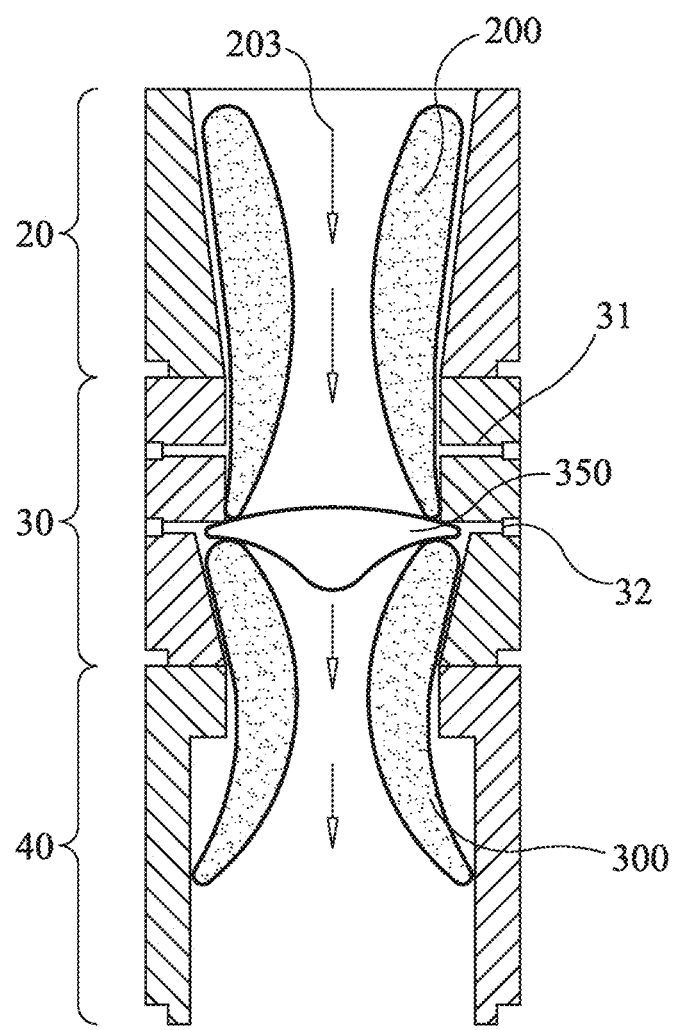
FIG. 9 shows a cutaway side view of a gasifier with an oxidation band.
Figure 10:
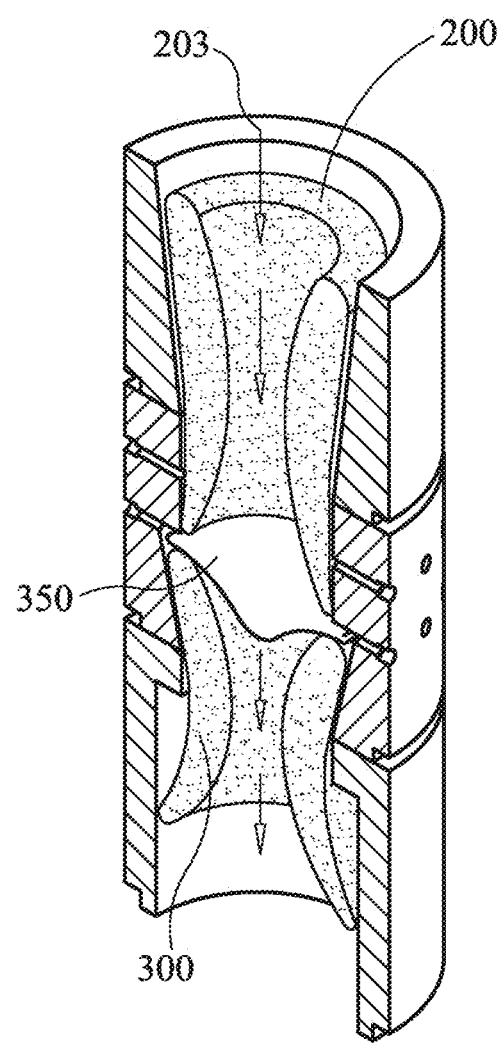
FIG. 10 shows a cutaway perspective view of a gasifier with an oxidation band.
Figure 17:
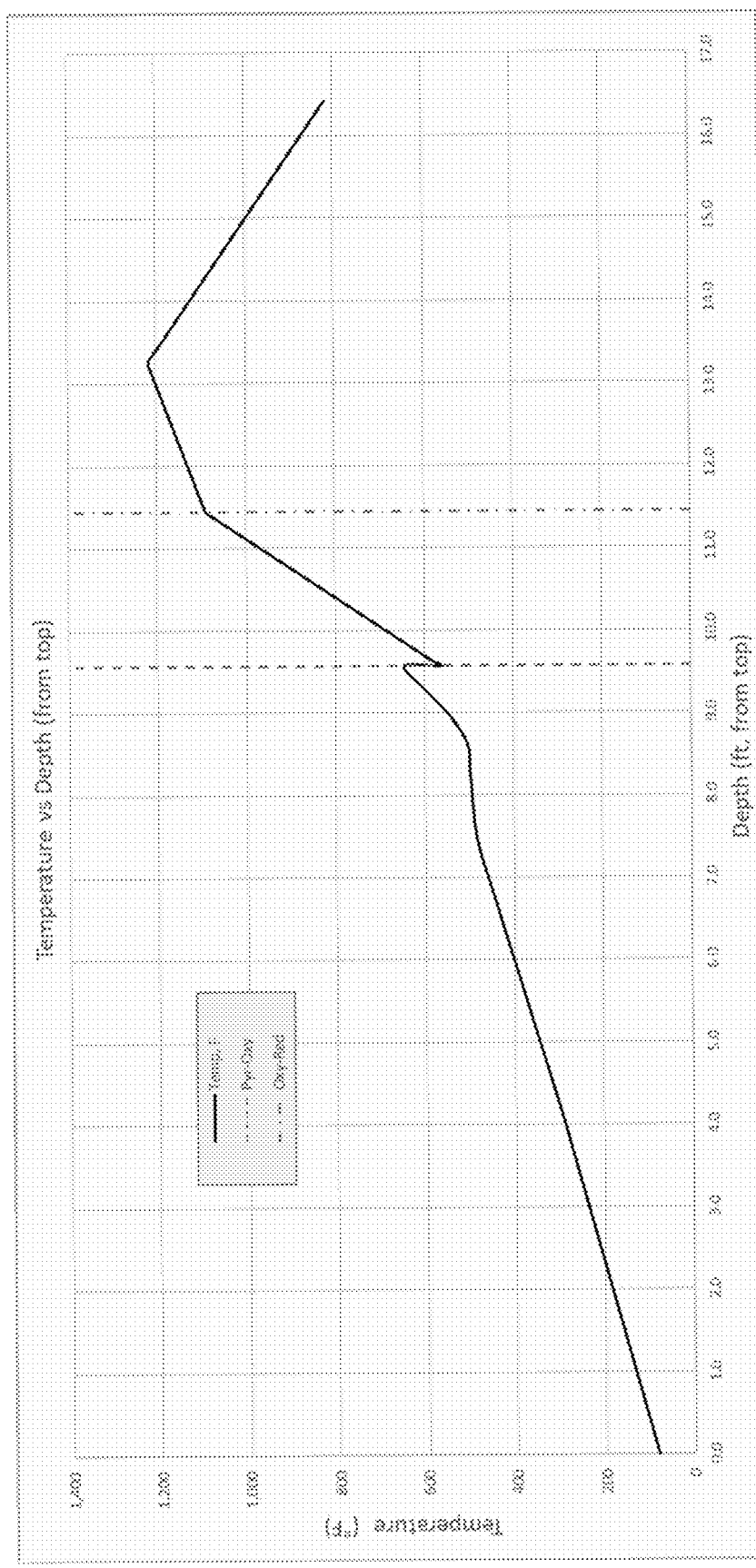
FIGS. 17-20 show gasifier performance graphs for producing high yield biochar.
Figure 18:
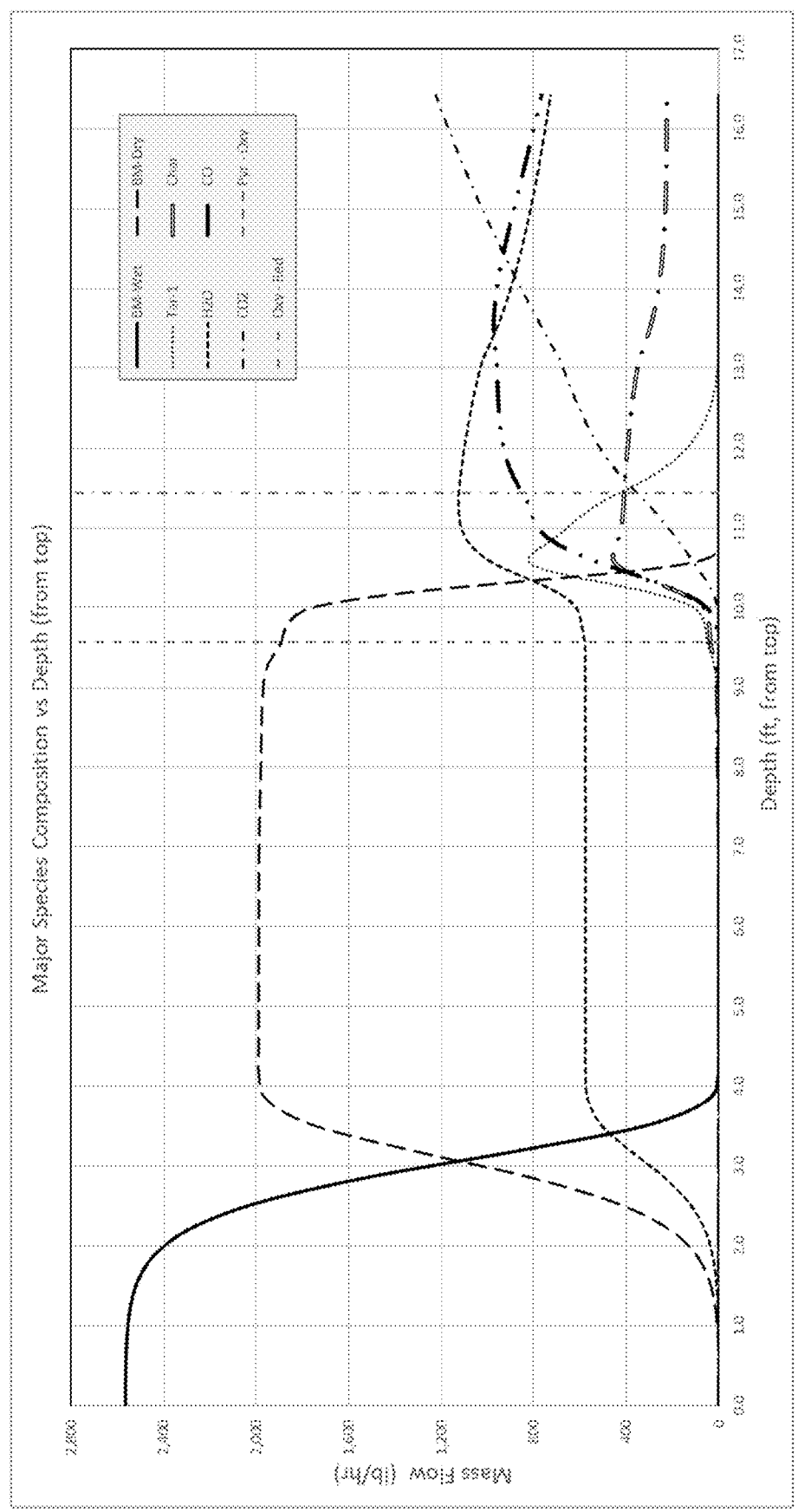
Figure 19:
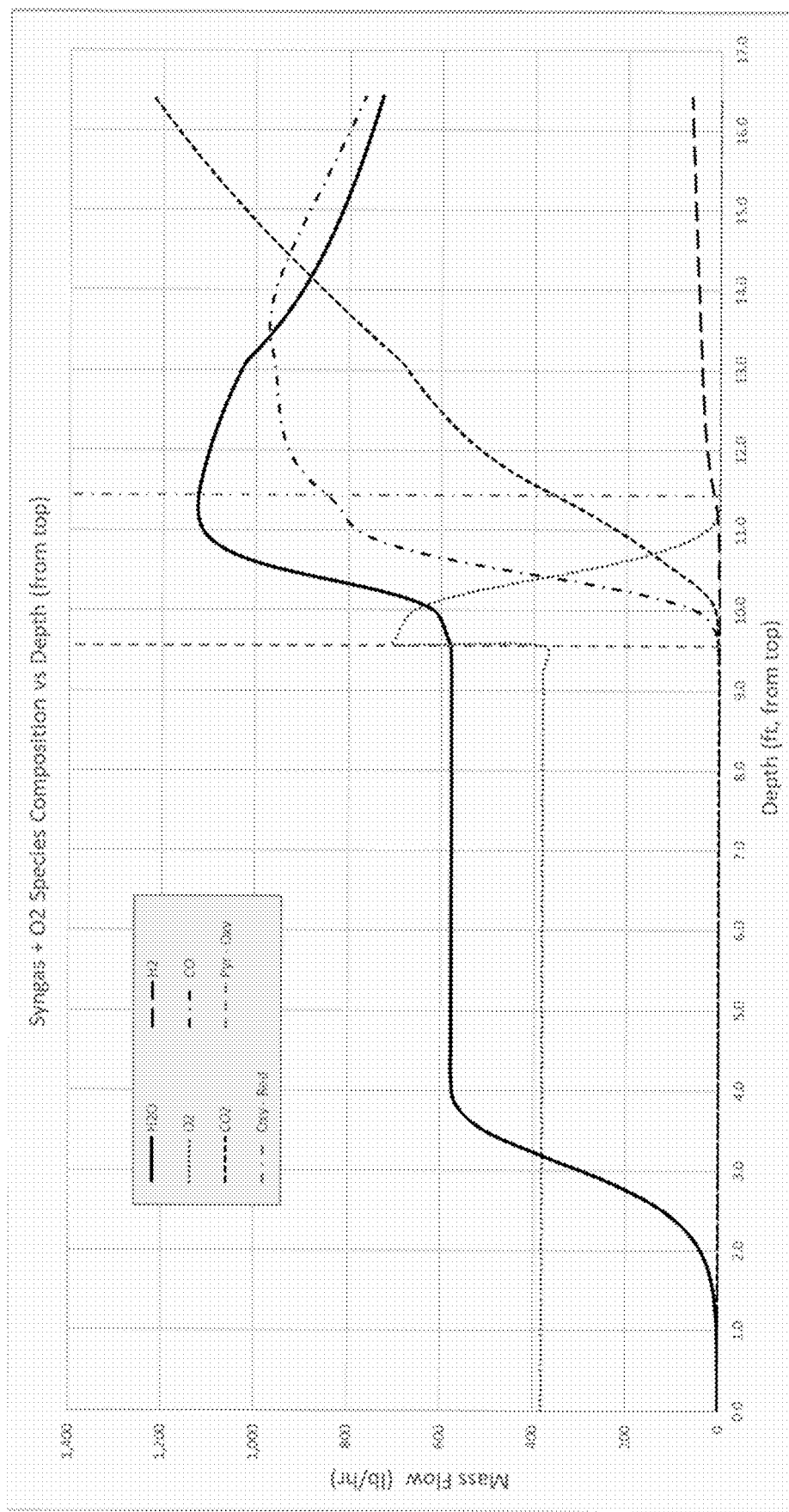
Figure 20:
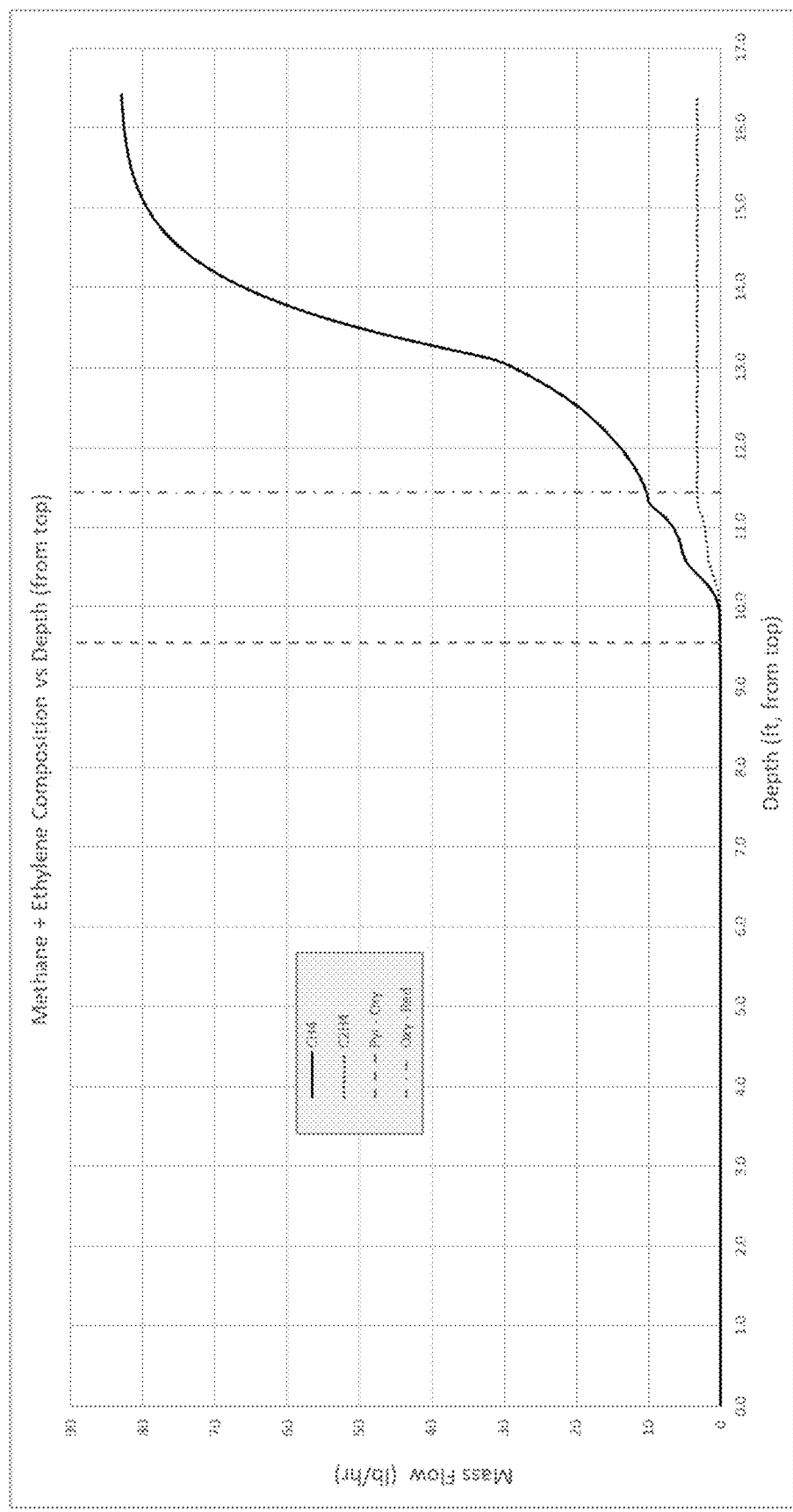

Shown in FIGS. 9 and 10, the feedstock in the Gasifier Flow Lane 203 travels down through the gasifier into the Oxidation Band 350. The Oxidation Band 350 is the point where significant heat is liberated by the deflagration of the cellulose matter in the feedstock. Once initiated during start-up, the Oxidation Band 350 is sustained by the addition of Oxidant Streams from the Plano Air Inlets 31, 32 and feedstock descending from above. The Oxidation Band 350 partially oxidizes the feedstock into Biochar and constituent gases of Producer Gas. Tar vapors generated in the Pyrolysis Zone 20 are further decomposed in the presence of steam under the high temperatures of the Oxidation Band 350 into additional Producer Gas.

As shown in FIGS. 7, 8, 9 and 10, the overall shape of the Oxidation Zone 30 is of a hollow tube, the tube having an inlet 301 and an outlet 303 of approximately the same size but is dilated in the middle 302. This is the opposite of traditional downdraft gasifiers where the Oxidation Zone narrows into a restriction point according to Superficial Velocity Theory.

In one embodiment, the inlet 301 and the outlet 303 of the Oxidation Zone 30 are half the diameter of the dilated section 302 of the Oxidation Zone 30. There are at least two rings of Plano Air Inlets 31, 32. In one embodiment, a higher ring 31 being approximately 11 inches above the lower ring 32 and a lower ring of Plano Air Inlets 32 being at the widest part of the dilated section 302 of the Oxidation Zone 30.

The extremely high temperatures generated by this Oxidation Band 350 produce the heat that drives the chemical and physical reactions in the Pyrolysis Zone 20 and Drying Zone 10 above (if applicable). The Oxidation Band 350 naturally tends to move upward in the gasifier toward the unconsumed feedstock and the Oxidant Stream supply above. Below the Oxidation Band 350 is a mixture of Biochar, which is relatively stable at high temperatures. The gasifier is designed to allow the Oxidation Band 350 to move up and down within the gasifier. In one embodiment, the Oxidation Band 350 may be held in place in the gasifier by using a grate 50 (located below the Reduction Zone 40) to remove the Biochar beneath the Oxidation Band 350, counteracting the tendency of the Oxidation Band 350 to move upward. Whenever the grate 50 stops rotating, the Oxidation Band 350 starts rising.

In one embodiment, a higher ring of Plano Air Inlets 31 positioned above the lower set of Plano Air Inlets 32, allows additional Oxidant Streams to be injected to the feedstock just before it enters the Oxidation Band 350. Using the rotational speed of the grate 50, the rate and ratio of the Bed Oxidant Stream, the Purge Oxidant Stream and the Plano Oxidant Streams, the Oxidation Band 350 can be held at any desired location within the gasifier. In one embodiment, the Oxidation Band 350 is held just below the lower ring of Plano Air Inlets 32.

The partial oxidation of feedstock is also complex but can be simplified into the following expressions:

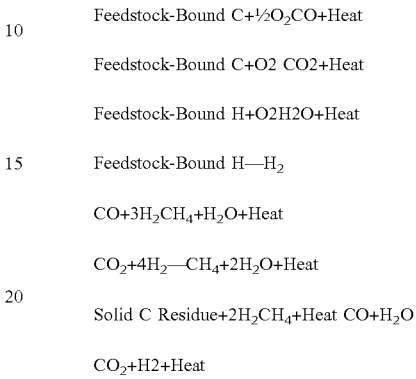

Feedstock-Bound $C + \tfrac{1}{2}O_2 \; CO + Heat$

Feedstock-Bound $C + O2 \; CO2 + Heat$

Feedstock-Bound $H + O2 \; H2O + Heat$

Feedstock-Bound $H \longrightarrow H_2$ $CO + 3H_2 \; CH_4 + H_2O + Heat$ $CO_2 + 4H_2 \longrightarrow CH_4 + 2H_2O + Heat$ Solid C Residue $+ 2H_2 \; CH_4 + Heat \; CO + H_2O$ $CO_2 + H2 + Heat$ The reactions in the Oxidation Zone 30 are exothermic and release the heat that operates the entire gasifier.

The Second Gradient (the Entrained Biochar Gradient)

Also shown in FIGS. 7, 8, 9 and 10, just below the Oxidation Band 350, the beginning of a second gradient of Biochar forms (1) vertically, beginning just below the lower ring of Plano Air Inlets 32 in the Oxidation Zone 30 and extending down along the wall of the Oxidation Zone 30 into the Reduction Zone 40 (2) horizontally, from the center of the gasifier to the wall of the gasifier (the "Entrained Biochar Gradient"). As Biochar leaves the Oxidation Band 350, the diameter of the Oxidation Zone 30 narrows to approximately the same size as the inlet 301 to the Oxidation Zone 30. The Pressure Wave from the Oxidation Band pushes the Biochar against the narrowing wall of the Oxidation Zone. The Densest Portion of the Entrained Biochar Gradient is illustrated at 300. The Pressure Wave slows the movement of the Densest Portion of the Biochar in the Entrained Biochar Gradient 300 relative to Biochar in the Gasifier Flow Lane 203. The Gasifier Flow Lane 203 remains intact even though the feedstock has changed phase, and Producer Gas and Biochar are now moving downward instead of feedstock.

The Densest Portion of the Entrained Biochar Gradient 300 runs down along the wall of the Oxidation Zone 30 into the Reduction Zone 40. As the Reduction Zone 40 is wider than the Oxidation Zone 30, the entrance to the Reduction Zone 40 forms another step. In one embodiment, the angled of the wall of the Oxidation Zone 30 and the inlet to the Reduction Zone 40 form a Kline-Fogleman step. As the Producer Gas crosses the step into a wider Reduction Zone 40 (i.e., a diameter expansion in the Reduction Zone 40), an eddy forms in the Reduction Zone 40. This eddy encourages mixing between the Producer Gas and Biochar in the Reduction Zone 40.

The Reduction Zone: Overall Description, Size and Functioning

As shown in FIGS. 1, 2, 7, and 8, the Reduction Zone 40 of the gasifier is equal to or greater in diameter than the outlet 303 of the Oxidation Zone 30. The two primary functions of the Reduction Zone 40 are to gasify residual carbon from the Biochar and to cool the Producer Gas. Both functions occur by the same mechanism, namely the endothermic reactions of Producer Gas constituents and the solid carbon contained within the Biochar.

As discussed above, when Producer Gas and Biochar enter the Reduction Zone 40, a turbulent eddy forms across the step between the Oxidation Zone 30 outlet 303 and the wider Reduction Zone 40. This turbulence in the Reduction Zone 40 causes much better mixing of Producer Gas with Biochar in the Reduction Zone 40 than in other gasifier designs. This allows for nearly complete gasification of the carbon in the bed and maximizes the cooling effect. In one embodiment, the Reduction Zone 40 of the gasifier maintains about a 2 to 6-foot grate above the grate 50.

Producer Gas exits typical downdraft gasifiers at temperatures around 1,500° F. or higher. Producer Gas exits this gasifier at temperatures less than 1,500° F. In one embodiment, it exits at temperatures less than 1,000° F. Also, the thick bed of Biochar allows about 90 to 99% of the fuel carbon to exit this gasifier as Producer Gas, depending on the feedstock.

The reduction reactions occurring in downdraft gasifiers have been well studied and are understood to involve:

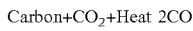

$$Carbon+CO_2+Heat\ 2CO$$

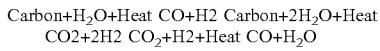

$$Carbon+H_2O+Heat\ CO+H_2\ Carbon+2H_2O+Heat$$
$$CO_2+2H_2\ CO_2+H_2+Heat\ CO+H_2O$$

The Gasifier Grate

The gasifier grate 50 of the gasifier may be made of stainless steel or another suitable material that is both durable, heat resistant and non-reactive such as silica carbide, silica oxide, aluminum oxide, refractory alloys or other ceramics, the grate having a top and a bottom face. In one embodiment and shown in FIGS. 3 and 4, the bottom face of the grate and shaft may be mounted on an elevating platform 80 that moves up and down and is controlled by variable control systems. As shown in FIGS. 3 and 4, the top face of the grate 50 is positioned below the lower edge of the Reduction Zone 40. In one embodiment, the Bypass is a gap of 0.25 to 2 inches between the Reduction Zone 40 and the top face of the grate 50.

The Spiral Groove

FIG. 11 shows the gasifier grate 50 which provides support for all of the solids in the gasifier. In one embodiment, the grate 50 has a frame 505 and two faces, a top face and a bottom face. FIGS. 11 and 12 show the top face of the grate 50 has a spiral groove 501. The spiral groove 501 is oriented in the gasifier so that it faces the Reduction Zone 40. The spiral groove 501 has a starting point at the center of the grate and a tail continuing outward to the edge of the grate 50. Therefore, in one embodiment the spiral grove spans the entire top face of the grate. The purpose of the spiral groove 501 is that it naturally moves Biochar outward from the center of the grate 50 to the edge of the grate 50 as the grate 50 rotates opposite the direction of the spiral groove 501. The Biochar follows the tail of the spiral groove 501 as the grate 50 turns in the opposite direction until the Biochar is forced from the Reduction Zone 40 through the Bypass.

In one embodiment of the Reduction Zone 40, silica carbide, silica oxide, aluminum oxide, a refractory alloy, other ceramics or some other heat resistant, high density, course material, lines the walls of the Reduction Zone 40. This heat resistant, high density, course material acts as file to grind away at any Biochar that is pressed against and dragged along the outer wall of the Reduction Zone 40 by the rotating grate 50. This combination of having a spiral groove 501 in the grate forcing Biochar toward and along the course wall of the Reduction Zone 40 assists in grinding large chunks of char into small enough pieces that they escape the Bypass. A person having ordinary skill in the art will recognize that different types of spirals may be used (e.g., Archimedean, logarithmic, etc.).

In one embodiment, the spiral groove 501 in the grate is a "v" shaped Archimedean groove 502, where the outer edge of one groove in the spiral meets the inner edge of the adjacent groove to form a raised edge. A purpose of the "v" shaped groove is to avoid having any 90° angles, which would otherwise create hot spots or thermally unstable sections of the grate 50.

Raising and Lowering the Grate/Bypass

In one embodiment, the grate 50 can be raised and lowered to create a higher or lower Bypass, allowing larger items that have inadvertently entered the gasifier and/or materials that have not gasified to be removed without shutting the gasifier down (e.g., brick, rocks, etc.). In an embodiment with a spiral groove 501 in the grate 50, these foreign bodies will be forced to the wall of the Reduction Zone 40, and then the grate 50 can be lowered to allow them to be discharged through the Bypass. This design allows for the gasifier to remain in service and still remove large, ungasified or unburned objects from the Reduction Zone 40. The ability to raise and lower the grate 50 can also be used if maintenance is ever required inside the gasifier. In addition, the Bypass 49 functions to control Producer Gas flow out of the Reduction Zone 40, the Bypass 49 acting similar to a valve. For example, a short Bypass increases resistance to Producer Gas flow through the grate 50 and causes pressure to build in the gasifier.

Elliptical Holes and Pie Slice Inserts in the Grate

FIGS. 13 and 14, show the assembled grate. FIGS. 15 and 16 show the grate "pie slice" segments 502. FIGS. 13 and 14 show a perspective and front view of an assembled grate having elliptical holes 503. In one embodiment the elliptical holes 503, such as kidney-shaped or oval-shaped holes are distributed symmetrically across the grate 50 (except there are no holes in the center of the grate above the mechanical shaft that lifts and rotates the grate). The purpose of the holes 503 is both to allow Biochar and Producer Gas to pass through the grate into the Biochar collection chute 60 below.

In one embodiment, the "pie slice" segments 502, 504, sit on a frame 505 of the grate 50. When each of the segments 504 is inserted into the frame 505, the grate is formed. This embodiment allows for replacement of a segment 504 rather than the entire grate 50 in the event part of the grate 50 becomes damaged, and also allows the gasifier to be fitted with customized segments 504 designed for particular types of feedstock. FIG. 15 shows a perspective view of removable segment of a grate. In one embodiment, the grate 50 also has a spiral groove 501 cut as a "v" 502 and elliptical, kidney or oval-shaped holes 503 cut through the spiral groove 501. FIG. 16 shows a top view of a removable segment of a grate.

Controlling the Gasifier Using the Grate

The shaft supporting and rotating the grate 50 can be formed of one or more pieces, depending on the size of the grate 50. The rotational speed of the grate 50 may be calibrated by a Control System, but typically ranges from 0.0001 RPM to 1 RPM, depending on the non-volatile components of the feedstock and the rate of production of Producer Gas. Since the 350 effectively rides on top of the bed of Biochar in the Reduction Zone 40, if the bed of Biochar in Reduction Zone 40 gets too thick, the Oxidation Band 350 will rise into the Pyrolysis Zone 20. Using thermocouples or other sensors to monitor the location of the Oxidation Band 350, the gasifier's Control System discussed below can be programmed to speed up the rotation of the grate 50 and remove Biochar at a higher rate, which reduces the height of the Biochar bed and lowers the Oxidation Band 350 back to appropriate locations. Conversely, the gasifier's Control System can slow the grate 50 if the bed of Biochar becomes too shallow and, consequently, the Oxidation Band 350 moves too close to the grate.

Char Collection Chute

Shown in FIGS. 1, 2, 5 and 6, below the gasifier is a Biochar collection chute 60, which may be made of steel, stainless steel or another strong, thermally stable, nonporous material. As Biochar exits the bottom or sides of the grate 50, it falls down the Biochar collection chute 60 below the gasifier. The Biochar collection chute 60 is arranged at an angle from the direction of the flow of Biochar in the Gasifier Flow Lane 203. In one embodiment, the angle is less than 90°, measured from the direction of Biochar flow in the Gasifier Flow Lane 203. In one embodiment, the angle is 45° to 80°, measured from the direction of Biochar flow in the Gasifier Flow Lane 203. In one embodiment, at least two Biochar collection chutes 60 are symmetrically arranged with respect to center axis of the gasifier.

Producer Gas Collection Vents/Horns

Shown in FIGS. 1, 2, 5 and 6, two or more Producer Gas collection vents 70 are positioned within the Biochar collection chute 60 symmetrically around the axis of the grate 50. The opening to the Producer Gas collection vents 70 faces downward so the Biochar does not fall directly into them as the Biochar falls from the grate 50. As the Producer Gas and Biochar fall into the Biochar collection chute 60, the Biochar separates from the Producer Gas by gravity, and the Producer Gas exits through the Producer Gas collection vents 70. Shown in FIG. 6, the Biochar residue boxes 90 are at the bottom of the Biochar collection chutes 60. The Biochar falls down a Biochar collection chute 60 into a Biochar residue box 90.

High Yield Production of Biochar

As described above, the downdraft gasification device is designed to convert as much useable energy as possible from waste feedstock to thermal energy for a variety of uses. By introducing novel changes to the existing gasification process design, the traditional process zones within the downdraft gasification device are collapsed (shrunken) creating a process through which increased feedstock throughput is achieved with higher quality (higher carbon content) and higher quantity biochar output on a continuous basis. Novel changes to the existing process methodology include temperature control and feedstock retention time for continuous production of high yield of biochar as described in more detail below.

Temperature Control

Drying zone temperature control is an integral function for increased carbon conversion in the existing downdraft gasification process. Process modeling has indicated that a drying zone temperature of 500° F.-700° F. greatly enhances the functionality of the drying zone across a broad spectrum of feedstocks and feedstock moisture contents. This ultimately equates to more rapid drying of the feedstock and expansion of the remaining zones within the device which increases both mass and carbon conversion.

By reducing the temperature requirement in the drying zone from about 200° F. to 300° F., the drying zone is effectively lengthened within the device enabling the oxidation and reduction zones in turn to reduce in length. This is the initial step in reducing carbon conversion efficiency and increasing total throughput. Lower temperatures in the drying zone allow moisture to be retained within the feedstock for a longer period through the device. This moisture inhibits conversion of carbon to syngas and increases biochar yield.

Feedstock Retention Time

Feedstock Retention Time (FRT) is an important parameter for controlling carbon conversion in the existing downdraft gasification process. Retention time is adjusted utilizing both rotation speed and vertical height of the rotating grate design. Lowering or increasing rotational speed of the grate coupled with an adjusting the grate height (smaller or larger area of the gap between the grate and the vertical refractory wall or refractory wall retaining ring) will control retention time of feedstock within the device. Longer retention time equates to higher conversion as more of the feedstock material is allowed to complete the conversion process to syngas. Maintaining the FRT to a range of about 5-20 minutes with and an optimal time of 10 minutes optimizes the conversion of the feedstock to biochar.

Grate Rotation and Height Adjustment

The production of Biochar is increased by adjusting the rotating speed (RPM) of the rotating grate and by adjusting the height of the grate (increasing or decreasing the area of the gap between the rotating grate and the vertical refractory wall or refractory wall retaining ring). This sets the retention time of the feedstock within the gasification device. For example, reducing retention time effectively allows more feedstock to be charged to the gasifier and lowers carbon conversion and syngas yield which in turn results in increasing the biochar yield on a continuous basis. This control adjustment also results in process temperature changes (more material through the drying zone at a lower temperature) which further reduces the size of the oxidation and reduction zones within the downdraft gasifier and allows the drying and pyrolysis zones to be extended to the full length available within the device. In sum, increasing the height of the gap and the RPM of the rotating grate decreases the FRT and increases the biochar yield. The range for the gap size is ¾"-2¼" with an optimal size of 1½". The range for the RPM of the rotating grate is 0.5-1.5 RPM with and optimal RPM of 0.75.

Moisture Content of Feedstock

Through manipulation of the drying zone temperature, the FRT and the gap size and rotational speed of the grate the moisture content of the feedstock can be optimized for high biochar yield during gasification. For a high yield of biochar during gasification, the range for the feedstock moisture content is 15%-30% with an optimal moisture content of 20%.

These novel process control changes create the means to allow the gasifier to switch from a highly efficient (carbon conversion) waste to energy gasification device to a highly efficient large-scale biochar production device. Carbon content of the end product biochar is improved from ~75% to a content as high as >95% total carbon, and mass conversion of the feedstock is reduced from ~90% conversion to a point as low as 75% conversion dependent upon feedstock moisture content. The result is a high carbon content biochar that can be produced in quantities continuously of 15% or more of the total feedstock.

FIGS. 17-20 are graphs showing data in support of the present invention and findings of the down draft gasifier performance from a 100-day test run limiting the drying zone temperature and adjusting the grate height and speed.

For FIGS. 17-20, the data in summary provides both the ranges and optimal conditions as follows:

Grate Gap Size:
Range=¾"-2¼"
Optimal=1½"
Rotating Grate RPM:
Range=0.5-1.5 RPM
Optimal=0.75 RPM
FRT in Drying Zone:
Range=5-20 minutes
Optimal=10 minutes
Drying Zone Temperature:
Range=200° F.-300° F.
Optimal=260° F.
Feedstock Moisture Content:
Range=15%-30%
Optimal=20%

In summary, when the feedstock retention time and temperature in the drying zone are decreased, the moisture content of the feedstock increases. In addition, increasing the rotating speed of the rotating grate and increasing the height of the gap both decrease the feedstock retention time in the drying zone. As a result, the production of syngas decreases, and the biochar yield increases. With a steady stream of feedstock, the production of biochar can be made continuous using the present down draft gasification device.

Feedstock Requirements

The gasifier can gasify a very broad range of feedstock. To determine whether a given feedstock or blend of materials will gasify effectively, the feedstock must be porous enough to allow Oxidant Stream to flow through it, have a suitable calorific density (btu/ft$^3$), have a suitable bulk density and a suitable chemical makeup. A person having ordinary skill in the art would recognize a suitable feedstock. In one embodiment of the gasifier, a suitable feedstock may be: (1) 25% or more chemically bound oxygen content (molecular basis), (2) 10% or less ash content, (3) 30% or less moisture content, and (4) greater than 15 lbs/ft$^3$ bulk density. There is some interaction between these variables.

All forms of biomass contain the basic chemical structure of $C_xH_yO_z$. This molecular structure is inherently unstable at elevated temperatures and will readily break down when heated. This is the fundamental driver of all types of biomass gasifiers. This molecular breakdown is highly exothermic and produces the heat necessary to sustain the further breakdown of biomass. Therefore, practically all forms of biomass are suitable feedstock for the gasifier, provided they meet the porousness and bulk density requirements.

Control Systems

Several methods and systems may be used as part of the overall Control System to induce changes to and to control the Oxidation Band 350. The Control System uses various algorithms to monitor and adjust the gasifier. The Control System may include subsystems capable of real-time adjustments and account for other methods that may only be adjusted while the gasifier is offline. Adjustments while the gasifier is offline may include: (1) adjusting the physical size and height of the Drying Zone 10 (or removing it); (2) adjusting the size of the holes 503 in the grate 50 (in one embodiment, by replacing its interchangeable segments 504). The Control System may include subsystems to implement real-time adjustments during operation of the gasifier related to: (a) the type of feedstock entering the gasifier; (b) the rate that feedstock enters the gasifier; (c) the fill level of the feedstock in the Drying Zone 10, if applicable; (d) the temperature of the Drying Zone 10, where applicable; (e) the volume, speed and pressure of Oxidant Stream delivered through the inlets at the top of the Pyrolysis Zone 20 (or Drying Zone 10, if applicable); (f) the volume, speed and pressure of Oxidant Stream delivered through the rings of Plano Air Inlets 31, 32; (g) the overall pressure of the gasifier; (h) the differential pressure between the various zones of the gasifier; (i) the location of the Oxidation Band 350 in the gasifier; (j) adjusting the rotational speed of the grate 50; (k) the vertical position of the grate 50 (i.e., adjusting height of the Bypass); (l) the thickness of the Biochar bed in the Reduction Zone 40; (m) testing and sampling the constituent components of the Producer Gas exiting the gasifier; (n) the temperature of the Producer Gas exiting the gasifier; and (o) the Producer Gas collection vent pressure and the pressure of the Producer Gas leaving the gasifier (the above examples, being "Variables").

In one embodiment of the gasifier, the Control System can gradually increase or decrease a Variable or start or stop any changes to the Variable entirely. For example, the Control System may need to slightly slow the rotational speed of the grate 50 at one time and then completely stop it at another point. As a person having ordinary skill in the art will recognize, electric motors and drives operate in two general ways some are fixed speed drives and others are variable frequency (speed) drives ("VFDs"). In one embodiment of the gasifier, a VFD is therefore attached to an on/off timer and used to control the rotational speed of the grate 50. By starting and stopping the VFD, the Control System may simulate a slow grate 50 rotation while maintaining sufficient torque from the VFD to rotate the grate 50. In other applications, such as the Oxidant Stream control system, where a higher torque is not required, the VFD may be used without an on/off timer.

Oxidant Stream and Biochar Flow Control

The rate at which Biochar leaves the gasifier also controls the vertical differential pressure across the gasifier (the thickness of the Biochar bed partly determines the pressure of the gasifier because the Biochar forms a pseudo-seal at the bottom of the gasifier). The vertical differential pressure across the gasifier, from the top of the Drying Zone 10 through to the bottom of the grate 50 is therefore controlled, in part, simply by increasing or decreasing the rotational speed of the grate 50, which ejects Biochar from the Reduction Zone 40. Described another way, if Biochar is not ejected fast enough from the gasifier it accumulates in the Reduction Zone 40 and the decreased remaining volume increases the pressure of the Producer Gas in the Reduction Zone 40 and the Oxidation Zone 30. In one embodiment, the vertical differential pressure of the gasifier is controlled by the height of the Bypass; as the height of the Bypass increases (i.e., by lowering the grate 50) the greater the flow of Producer Gas and Biochar from the gasifier. The rate of Producer Gas generation is proportional to the concentration of Oxygen in the Oxidant Streams and the flow rate of the Oxidant Streams being introduced to the gasifier. The Control System measures and regulates the Oxidant Streams using standard methods known in the art. During operation, the gasifier will create Producer Gas having a calorific density of 125 to 145 btu/ft$^3$. This quality of Producer Gas will continue to be produced for so long as sufficient Oxidant Stream and suitable feedstock are made available to the gasifier. In one embodiment, the gasifier converts between 12 and 120 tons of feedstock per day.

Continuous and Contaminant Free Production of Biochar

As described above, by introducing novel changes to the existing gasification process design, the traditional process zones within the downdraft gasification device are collapsed (shrunken) creating a process through which increased feedstock throughput is achieved with higher quality (higher carbon content) and higher quantity biochar output on a continuous basis. The next step in the evolution of this technology is to process the high yield of biochar to provide a continuous contaminant free biochar from variable waste product feedstocks without increased feedstock preparation. "Contaminant free" biochar means biochar in which ungasified material, ferrous metal, non-ferrous metal and biochar larger than the pre-selected size have been removed. The present method uses a high yield biochar downdraft gasification system for continuous biochar production providing an adjustable yield between 10% and 25% of total feedstock input with an input capacity ranging from 700 kg/hr.-2,400 kg/hr.; depending on operating conditions. The present method is adjustable to variable biochar specifications including yield, particle size and moisture content.

Shown in FIG. 6, the Biochar residue boxes 90 are at the bottom of the Biochar collection chutes 60. The Biochar falls down a Biochar collection chute 60 into a Biochar residue box 90. The Biochar residue box has a tube-style auger 91 called the "Residue Auger." The Residue Auger 91 moves the Biochar into a pocket valve 92 that is bolted to the end of a cross pipe spool, which is bolted to the Residue Auger 91. In one embodiment, the pocket valve 92 is a standard, air-actuated 8" or 10" ball valve where the ball is sealed on one end. When in the "up" position, the ball forms a bucket. The Residue Auger 91 is controlled by the gasifier's Control System so that while the pocket valve 92 is in the up position, the Residue Auger 91 deposits Biochar into the pocket valve 92. In one embodiment, when the Control System stops this process, the Residue Auger 91 stops and the pocket valve 92 rotates to the "down" position, dumping its contents into an external collection bin or some other secondary removal system. Because the ball on the pocket valve 92 is closed on one end, the pocket valve 92 remains sealed at all times and prevents Producer Gas from leaking out of the Biochar residue box 90. A small amount of Producer Gas does escape but can be vented safely by a high-point vent pipe or drawn out by vacuum pump.

Figure 21:
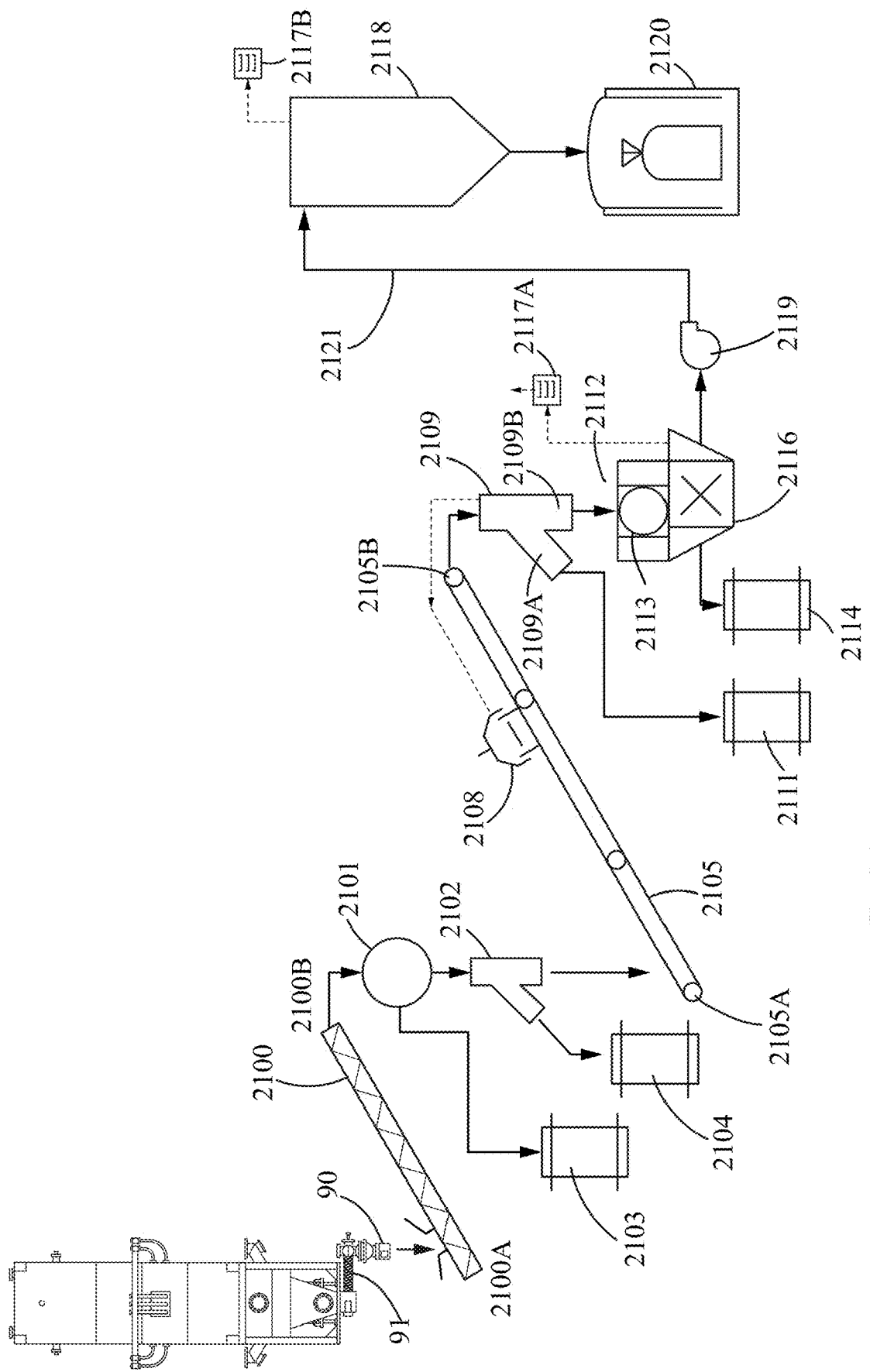
FIG. 21 shows a schematic side view of a gasifier reactor and biochar production system for continuous production of contaminant free biochar after feedstock gasification.

FIG. 21 shows a side schematic view of a gasifier reactor and biochar production system for continuous production of contaminant free biochar after feedstock gasification. "Contaminant free" biochar means biochar in which ungasified material, ferrous metal, non-ferrous metal and biochar larger than the pre-selected size has been removed. In one embodiment, an enclosed cooling conveyor 2100 is configured to receive biochar by gravity feed from the biochar collection chute 60, the Residue Auger 91, the pocket valve 92, the Biochar residue box 90 and/or other open bottom gravity fed storage bins commonly known in the art for a downdraft gasifier. The cooling screw conveyor 2100 comprises a proximal end 2100A operably connected to the gasifier and a distal end 2100B operably connected to a drum magnet. The cooling conveyor 2100 transfers the biochar by gravity feed to a drum magnet 2101 that separates and removes ferrous metals such as steel, iron and alloys of iron, from the biochar. The cooling conveyor 2100 may be positioned at an angle, within the equipment specification limits. In one embodiment, the drum magnet 2101 has an open bottom with an outlet for ferrous materials 2302 (see FIG. 23) and a ferrous free biochar outlet 2303 (see FIG. 23) for the biochar product to be separated. The ferrous materials are transferred by gravity feed into a first bin 2103. The ferrous free biochar is transferred by gravity feed into a first diverter 2102 which is configured to separate the ferrous free biochar from unburned materials. The unburned materials are then transferred by gravity feed to a second bin 2104 and the ferrous free biochar is transferred by gravity feed to a second conveyor 2105 comprising an integrated metal detector 2108, a proximal end 2105A operably connected to the first diverter 2102 and a distal end 2105B operably connected to a second diverter 2109. The unburned materials collected in bin 2104 can be transferred back to the gasifier for gasification.

In one embodiment the distal end 2105B of the second conveyor 2105 is co-located and operably connected to a second diverter 2109. The second conveyor 2105 transfers the biochar to the second diverter 2109. The second diverter 2109 is configured to receive the ferrous free biochar by gravity feed. The second diverter 2109 has an open bottom with a first outlet 2109A for non-ferrous material and a second outlet 2109B for ferrous free and non-ferrous free biochar. The second diverter 2109 is configured with an adjustable splitter (not shown) or moveable gate 2202 (see FIG. 22) electromechanically connected to the metal detector 2108 for separating the non-ferrous material from the non-ferrous free biochar and directing the non-ferrous metal by gravity feed into a third bin 2111 and transferring the remaining biochar into an open feed granulator 2112. Non-ferrous material includes metals such as but not limited to aluminum, copper, lead, nickel, tin, titanium, zinc, and alloys such as brass.

In one embodiment, the metal detector 2108 is operably connected to the second diverter 2109. In one embodiment, the metal detector 2108 is electro-mechanically connected to the second diverter 2109. The default configuration of the second diverter 2109 directs the stream of biochar by gravity feed into the granulator 2112. In one embodiment, when the metal detector 2108 detects non-ferrous metal in the biochar stream that is on the second conveyor 2105, the metal detector 2108 sends an electro-mechanical signal to the second diverter 2109 and a mechanism such as the moveable gate 2202 (see FIG. 22) redirects the flow of the biochar from the granulator 2112 and to the third bin 2111. In one embodiment, the electro-mechanical signal from the metal detector 2108 to the second diverter 2109 is connected to a timer 2108A (not shown) so that stream of biochar is directed to the third bin 2111 for a pre-selected time then reverts the biochar stream back to the granulator 2112. The second diverter 2109 is configured to transfer the biochar by gravity feed to both the granulator and the third bin 2111.

The open feed granulator 2112 grinds the biochar to a preselected size. The granulator comprises a size adjustable grinder 2400 (see FIG. 24), a size adjustable screen 2113 and a collection chamber 2116. The grinder 2400 and the screen 2113 are adjustable for a user to pre-select the desired size of the final biochar product (hereafter "pre-size selected"). In one embodiment the granulator 2112 reduces the biochar size to a size range between 0.2 and 4.0 mm depending on their subsequent use. In one embodiment, the granulator 2112 reduces the biochar size to and accuracy of 1/1000 of an inch such as to 0.125 inches (3.17 mm) or less. The adjustable screen 2113 captures oversized material and transfers by gravity feed the oversized material to a fourth reject receiving bin 2114. The size rejected materials collected in bin 2114 can be transferred back to the granulator 2112 for further grinding or back to the gasifier for gasification. The pre-selected, properly sized biochar is collected by a gravity feed into a collection chamber 2116 located below the granulator screen while undersized dust is removed via a first dust collector 2117A located within the granulator 2112. The granulator is operably connected to the second diverter 2109 and the pneumatic transfer system 2119. The final sized biochar product is transferred to a biochar storage bin 2118 that has a second dust collector 2117B using the pneumatic transfer system 2119 (see FIG. 25) and ductwork system 2121. Ductwork systems are commonly known in the art. In the present invention the ductwork system 2121 is operably connected to the pneumatic transfer system 2119 and the storage bin 2118. The contaminant free biochar is stored in the storage bin 2118 and gravity fed into a bulk bag loader 2120 for distribution and use.

In one embodiment, the cooling conveyer 2100 is a screw conveyor at least 24 inches wide and at least 20 feet long to sufficiently cool and meter the biochar from the reactor vessel to the drum magnet 2101. In one embodiment, the cooling conveyor must reach a sufficient height over the drum magnet 2101 to allow the biochar to be gravity fed into the drum magnet 2101. In one embodiment the cooling conveyor 2100 is enclosed to contain dust from the biochar. In one embodiment other conveyors such as but not limited to a bucket conveyer is used to transfer the biochar from the reactor to the drum magnet 2101.

The temperature range of biochar as it exits downdraft gasifier are typically between 500- and 700-degrees Fahrenheit ("F"). It is necessary for safe handling of the biochar to cool the biochar for downstream removal of contaminants and sizing. Safe handling includes both personal protection and equipment protection. Additionally, at temperatures greater than 100 F, the biochar could be considered pyrophoric at atmospheric conditions. Cooling the biochar to a point below 100 F ensures that no pyrophoric material enters the processing unit. A number of methods known in the art can be used to cool the biochar even including allowing the biochar to be stored for a preset time in a storage bin. But for continuous production of high yield biochar the goal is to cool the biochar to safe temperatures as quickly as possible. The present invention uses a cooling conveyor 2100 to achieve optimal temperatures at about 100 F for downstream processing and sizing. The cooling conveyor can be cooled by treated or potable water, effluent water from local sources, cooling tower circulation systems, air conditioning systems and other techniques commonly known in the art.

In one embodiment, the second conveyor 2105 is a flat infeed belt conveyor at least 24 inches wide and at least 20 feet long and that is set at an angle, within equipment specification limits, so that its distal end 2105B reaches a sufficient height over open feed granulator 2112 to allow the biochar to be gravity fed into the granulator 2112. In one embodiment other conveyors such as but not limited to a bucket conveyer is used to transfer the biochar from first diverter 2102 to the second diverter 2109.

Figure 22:
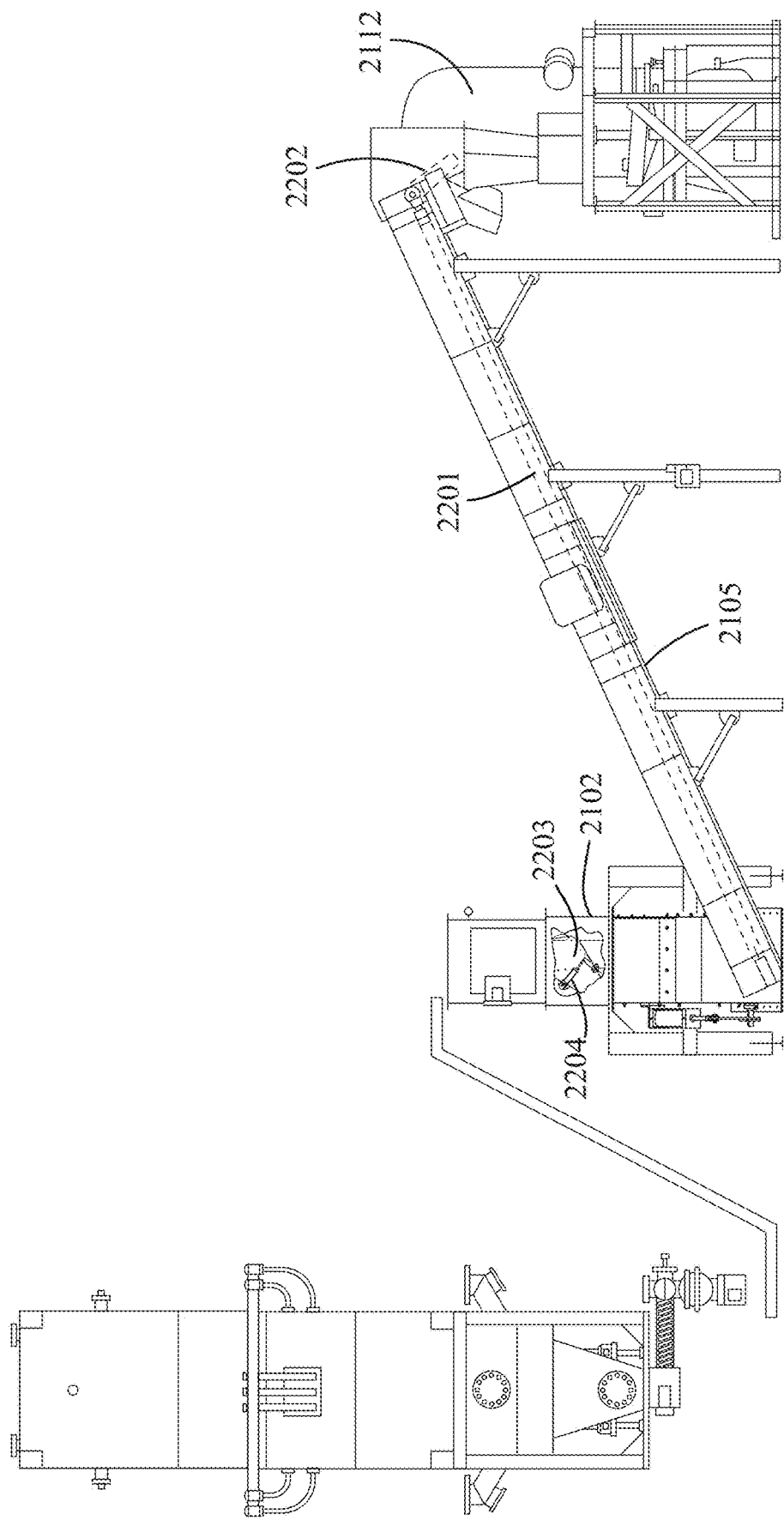
FIG. 22 is a partial cutaway perspective view of the system for continuous production of contaminant free biochar after feedstock gasification.

FIG. 22 is a partial cutaway perspective view of the system for continuous production of contaminant free biochar after feedstock gasification. FIG. 22 shows the location of the infeed belt 2201 of the second conveyor 2105. FIG. 22 also shows the location of a mechanical gate 2203 controlled in one embodiment by a pneumatic arm 2204 inside the first diverter 2102 that directs the flow of the biochar stream to either the second bin 2104 or to the second conveyor 2105. In one embodiment, the first diverter 2102 comprises a two-part open bottom gravity fed chute and a moveable gate 2203 operably connected to an electromechanical arm (not shown) similar in function to the pneumatic arm 2204. Other devices for moving directing the stream of biochar are commonly known in the art. In such an embodiment, the gate moves in and out to adjust the location of the plate to direct the flow of the biochar into one section of the two-part of the open bottom chute. The first section directs the biochar flow the second conveyor 2105. The second section directs unburned materials to bin 2104.

In one embodiment, the first diverter 2102 is located above the drum magnet 2101. In another embodiment the first diverter 2102 is located below the drum magnet 2101. In another embodiment the first diverter 2102 is integrated with the drum magnet 2101 either above or below the drum magnet 2101.

Figure 23:
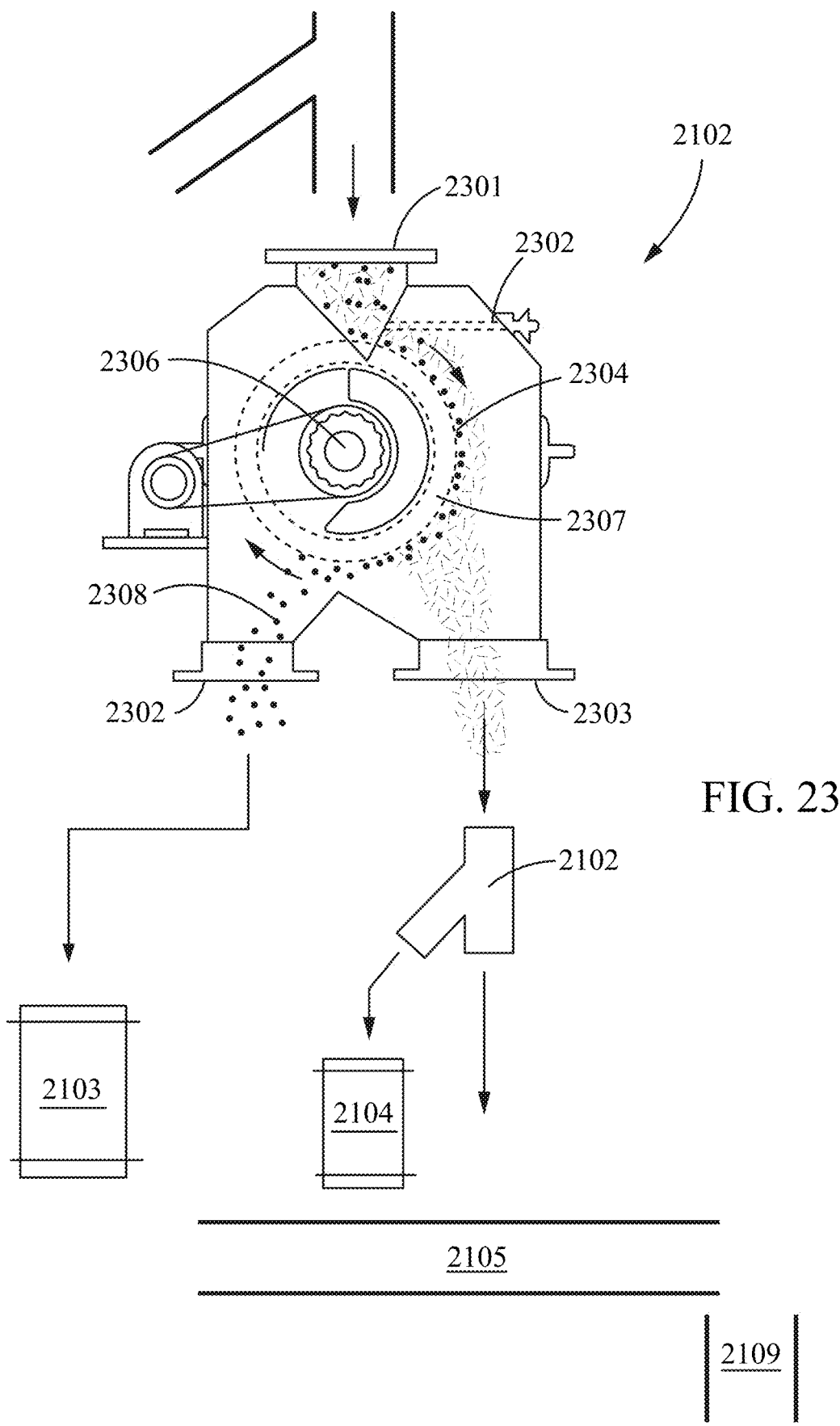
FIG. 23 is a cutaway side schematic view of the drum magnet.

FIG. 23 is a cutaway side schematic view of the drum magnet 2101. Rotating drum magnets 2101 are designed for continuous self-cleaning of metal contaminants from product flow streams. Generally speaking, as product enters the housing inlet 2301, an adjustable feed gate 2302 meters the flow of product to the drum surface 2304. The drum has a stationary, 180-degree arc, internal magnet 2306 with an outer drum that rotates 2307. When product passes over the powerful magnetic field, metal contaminants 2308 are attracted to the drum surface 2304 where they are safely held on to until the ferrous material passes through the magnetic field where it is discharged to the rear of the drum housing and gravity fed into first bin 2103. Ferrous free biochar is discharged to the front of the drum housing and gravity fed into the primary diverter 2102. Drum magnets provide custom sizes, double drum configurations, vibratory feeders mounted to a product inlet, pantleg discharge, explosion proof motors and an open bottom outlet with an adjustable splitter for ferrous materials and clean product to be separated.

Figure 24:
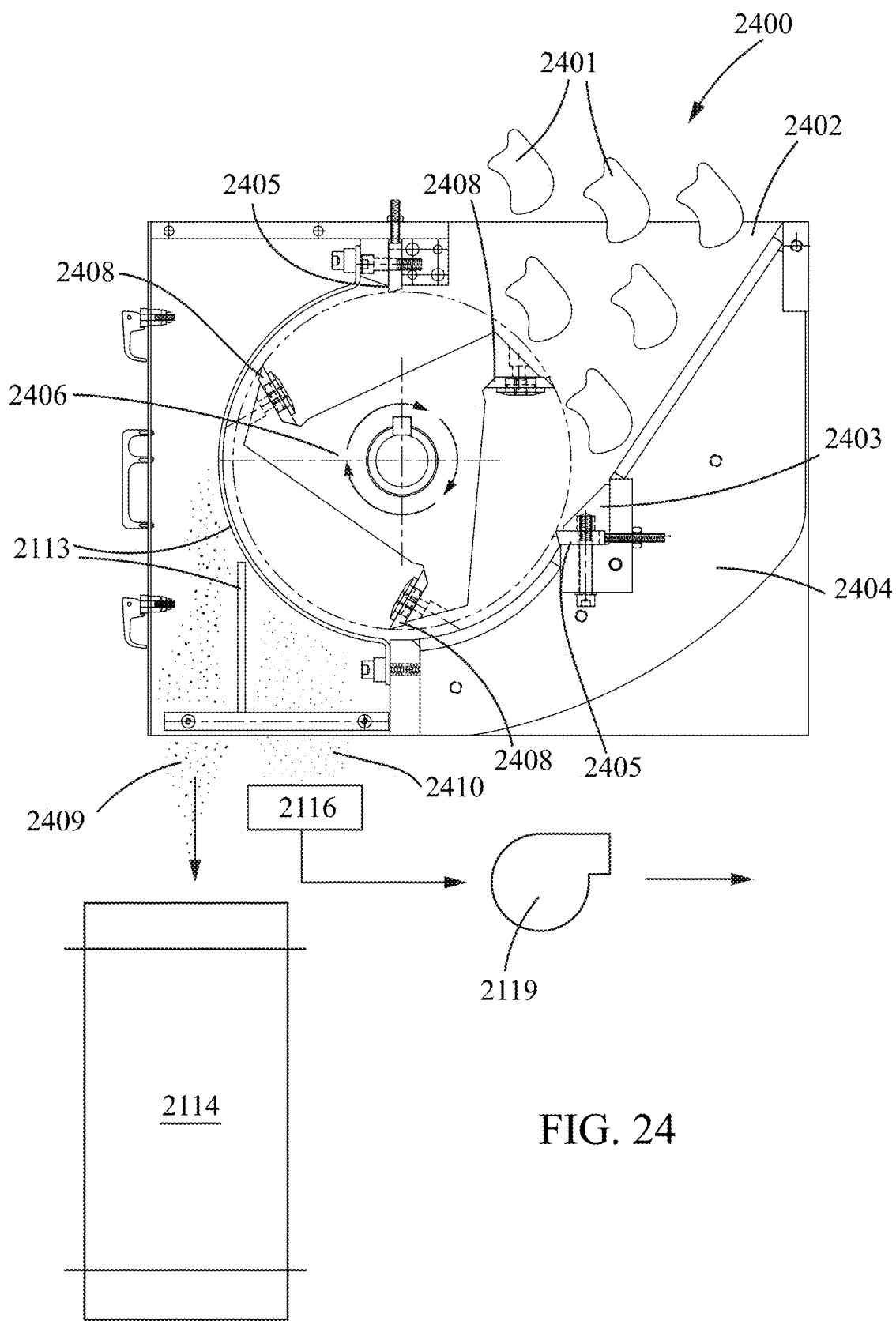
FIG. 24 is a cutaway side schematic view of a granulator grinder.

FIG. 24 is a cutaway side schematic view of the granulator grinder 2400. Feed material 2401 is fed into an open cutting chamber 2402 in the top of the grinder 2400. The grinder comprises at least one bed cutting knife 2405, a lower bed cutting knife clamp 2403 a throat plate 2404, a rotor assembly 2406, a screen 2113 and a rotor knife 2408. Granulation is the process of forming grains or granules from a powdery or solid substance, producing a granular material. Typically, granulation involves agglomeration of fine particles into larger granules, typically of size range between 0.2 and 4.0 mm depending on their subsequent use. For this application, granulation is the reduction in size of a larger solid material (biochar particle) to create a grain or granule of a pre-specified size required for specific use. In a granulator 2112, cutting knives 2408 are mounted on an open rotor assembly 2406 spun to high speeds by an electric motor. (not shown) As the biochar 2401 enters this open cutting chamber 2402, the rotor knife 2408 come into contact with the at least one stationary bed knife 2405 cutting or grind the biochar into size selected ("size specific") particles.

The open feed granulator 2112 grinds the biochar to a preselected size. In one embodiment, the grinder 2400 reduces the biochar size to 0.125" (3.17 mm) or less. The screen 2113 captures oversized material 2409 and transfers by gravity feed the oversized material to a reject receiving fourth bin 2114. The oversized material can be transferred either back to the granulator for additional grinding and a second round of screening or transferred back to the gasifier for gasification.

The properly preselected size ("size specific") biochar 2410 is collected by a gravity feed into a chamber 2116 located below the granulator screen while undersized dust is removed via a first dust collector 2117A located within the granulator 2112. The final sized biochar product is transferred to a biochar storage bin 2118 that has a second dust collector 2117B using a pneumatic transfer system 2500 (see FIG. 25) and ductwork system 2121 commonly known in the art. Ductwork systems are commonly known in the art. In the present invention the ductwork system 2121 is operably connected to the pneumatic transfer system 2119 and the storage bin 2118. The contaminant free biochar is stored in the storage bin 2118 and gravity fed into a bulk bag loader 2120 for distribution and use. In one embodiment, the biochar storage bin 2118 that has a second dust collector 2117B.

Figure 25:
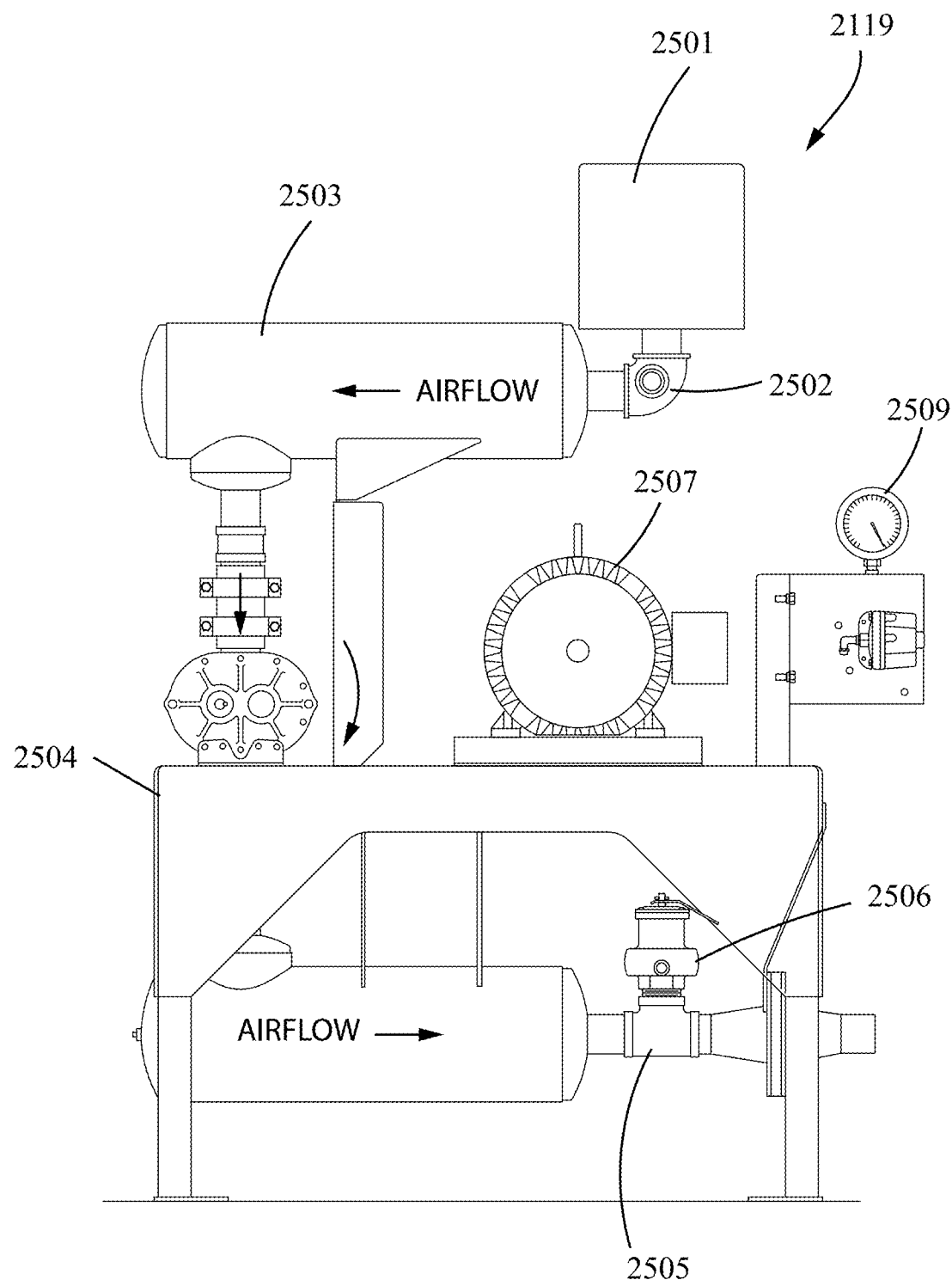
FIG. 25 is a side schematic view of the pneumatic transfer system.

FIG. 25 is a side schematic view of the pneumatic transfer system 2119 set up to provide air to a pressure conveying system or a process requiring positive pressure air. The pneumatic transfer system 2119 transfers the final size specific biochar product through a duct system (not shown) to the biochar storage bin 2118. In one embodiment, the pneumatic transfer system 2119 comprises an intake filter 2501; a differential pressure indicator 2502, an intake silencer 2503, a blower 2504, a discharge silencer 2505 and a pressure relief valve 2506, a motor 2507 and a pressure gauge 2509.

Typically, a conventional positive displacement blower used on such a package and is limited to supplying air at a maximum design pressure of 15 pounds per square inch ("psig.") The volumetric output of the blower is a result of the speed (rpm) the blower is operating at and the differential pressure across the blower. The blower rpm can be adjusted by changing sheaves on the drive or by changing the speed of the motor using an AC Inverter. The blower functions by the rotation of intermeshing lobes that displace air through the housing of the blower.

What is described is a method and system for production of contaminant free and size specific biochar. This process is made continuous by continuous operation of the downdraft gasifier herein described. Production of high yields of biochar are also herein described. By combining the presently described system and method for production of contaminant free and size specific biochar with the high yield and continuous production of biochar previously described using the downdraft gasifier, the present invention provides a system and method for continuous production of contaminant free and size specific biochar.

The advantages of the present system and method include that the system design comprises equipment and components that are commercially available equipment and capacity flexibility (turn-down/turn-up) to serve one or more gasifiers in parallel. The present system and method offer continuous operation vs batch operation. It also offers process control. That is a narrower range of control that allows for tailoring biochar quality to varying customer specifications (char particle size, moisture content, carbon content, foreign material content). The present system is easy to operate and can be partially or fully automated in continuous operation with gasifier. The present system provides minimal loss of biochar as materials that are separated and rejected through the drum magnet or diverters can collected in an integral bin design so the materials can be transferred back to the gasifier for gasification. Recycling unburned materials through the system and removing only the contaminants maximizes the production of contaminant free biochar.

The present system is also flexible in that it provides for adjustable size selection using the variable adjusted grinder and screening and adjustable moisture content of the final product using. In one embodiment, the moisture content is held below 5% as it passes through the current system and process; but water can be added to increase the moisture content of the contaminant free biochar in order to meet with any customer specification. This would typically be accomplished after the contaminant free biochar has been in storage bin 2118 and prior to packaging the material in the bulk bag loader 2020 through the addition of water by injection into the product stream form the storage bin 2118 to the bulk bag loader 2020 or by addition of a mixing station configured for wetting product to exact specifications. (not shown)

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing an invention (especially in the context of the following claims) are to be construed to cover both the singular and the plural, unless otherwise indicated herein or clearly contradicted by context. The terms "comprising," "having," "including," and "containing" are to be construed as open-ended terms (i.e., "including, but not limited to,") unless otherwise noted. Recitation of ranges as values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention (i.e., "such as, but not limited to,") unless otherwise claimed. No language in the specification should be construed as indicating any non-claimed element as essential to the practice of the invention.

Preferred embodiments of this invention are described herein. Variations of those preferred embodiments may become apparent to those having ordinary skill in the art upon reading the foregoing description. The inventors expect that skilled artisans will employ such variations as appropriate, and the inventors intend for the invention to be practiced other than as specifically described herein. Accordingly, this invention includes all modifications and equivalents of the subject matter recited in the claims appended hereto as permitted by applicable law. Moreover, any combination of the above-described elements in all possible variations hereof is encompassed by the invention unless otherwise indicated herein or otherwise clearly contradicted by context.

While the disclosure above sets forth the principles of the present invention, with the examples given for illustration only, one should realize that the use of the present invention includes all usual variations, adaptations and/or modifications. within the scope of the claims attached as well as equivalents thereof. Those skilled in the art will appreciate from the foregoing that various adaptations and modifications of the just described embodiments can be configured without departing from the scope and sprit of the invention. Therefore, it is to be understood that, within the scope of the appended claims, the invention may be practiced other than as specifically described herein.

What is claimed is:

1. A method for continuous production of contaminant free and size specific biochar comprising the following sequential steps:

Conveying biochar resulting from continuous feedstock gasification in a downdraft gasifier to an enclosed cooling screw conveyor, said cooling screw conveyor comprising a proximal end operably connected to the gasifier and a distal end operably connected to a drum magnet;

Separating and removing ferrous metal from the biochar using the drum magnet;

Transferring the biochar into a first diverter operably connected to the drum magnet;

Separating and removing unburned materials from the biochar using the first diverter;

Transferring the biochar to a belt conveyor comprising an integrated metal detector, a proximal end operably connected to the first diverter and a distal end operably connected to a second diverter;

Transferring the biochar to the second diverter operably connected to the metal detector;

Separating and removing non-ferrous metal from the biochar using the second diverter;

Transferring the biochar to a granulator operably connected to the second diverter, said granulator comprising a size adjustable grinder, a size adjustable screen and a collection chamber;

Grinding and screening the biochar to a pre-selected size using the granulator; and Collecting the size specific biochar in the collection chamber of the granulator.

2. The method of claim 1, further comprising: transferring the contaminant free, size specific biochar from the granulator collection chamber to a biochar storage bin using a pneumatic transfer system operably connected to the granulator and biochar storage bin.

3. The method of claim 1, further comprising: transferring the ferrous metal from the drum magnet to a first bin.

4. The method of claim 1, further comprising: transferring the unburned materials from the first diverter to a second bin.

5. The method of claim 4, further comprising: transferring the unburned materials from the second bin back to the gasifier for gasification.

6. The method of claim 1, further comprising: transferring the non-ferrous metal from the second diverter to a third bin.

7. The method of claim 1, further comprising: transferring oversized material to a fourth bin.

8. The method of claim 7, further comprising: transferring the oversized material from the fourth bin back to the granulator for additional grinding and screening.

9. The method of claim 1, wherein the gasifier has a drying zone and the temperature of the drying zone is between 200 degrees Fahrenheit and 300 degrees Fahrenheit.

10. The method of claim 1, wherein the gasifier has a drying zone and the temperature of the drying zone is 260 degrees Fahrenheit.

11. The method of claim 1, wherein the gasifier has a bypass and the bypass is between ¾ inches and 2¼ inches.

12. The method of claim 1, wherein the gasifier has a bypass and the bypass is 1½ inches.

13. The method of claim 1, wherein the gasifier has a rotating grate and the rotation of the grate is between 0.5 and 1.5 rotations per minute.

14. The method of claim 1, wherein the gasifier has a rotating grate and the rotation of the grate is 0.75 rotations per minute.

15. The method of claim 1, wherein the gasifier contains feedstock and has a drying zone and feedstock is retained in the drying zone between 5 minutes and 20 minutes.

16. The method of claim 1, wherein the gasifier contains feedstock and has a drying zone and the feedstock is retained in the drying zone is 10 minutes.

17. The method of claim 1, wherein the gasifier contains feedstock and the feedstock has a moisture content between 15 percent and 30 percent.

18. The method of claim 1, wherein the gasifier contains feedstock and the feedstock has a moisture content is 20 percent.

* * * * *